United States Patent [19]

Nagura et al.

[11] Patent Number: 5,525,991
[45] Date of Patent: Jun. 11, 1996

[54] MOBILE OBJECT IDENTIFICATION SYSTEM

[75] Inventors: Michinaga Nagura, Kariya; Manabu Matsumoto, Handa; Toshihide Ando, Chita-gun; Mutsushi Yamashita, Handa; Taisei Katoh, Toyoake; Yoshiyuki Kago, Nishio; Atsushi Watanabe, Toyokawa; Naoki Tokitsu, Kariya, all of Japan

[73] Assignee: Nippondenso Co., Ltd., Kariya, Japan

[21] Appl. No.: 204,179

[22] PCT Filed: Jun. 24, 1993

[86] PCT No.: PCT/JP93/00858

§ 371 Date: Feb. 24, 1994

§ 102(e) Date: Feb. 24, 1994

[87] PCT Pub. No.: WO94/00921

PCT Pub. Date: Jan. 6, 1994

[30] Foreign Application Priority Data

Jun. 25, 1992 [JP] Japan .................................. 4-167328
Jun. 25, 1992 [JP] Japan .................................. 4-167329
Jun. 25, 1992 [JP] Japan .................................. 4-167330
Dec. 14, 1992 [JP] Japan .................................. 4-333151

[51] Int. Cl.$^6$ .............................. G01S 13/75; H04B 1/59
[52] U.S. Cl. ................. 342/42; 340/825.54; 340/825.55; 235/384
[58] Field of Search ............................ 340/636, 825.54, 340/928, 825.15, 825.32, 825.55; 342/42, 44, 69; 235/384; 250/341.1, 338.1

[56] References Cited

U.S. PATENT DOCUMENTS

| 4,025,791 | 5/1977 | Lennington et al. | 250/341 |
| 4,325,146 | 4/1982 | Lennington | 340/825.54 |
| 4,912,471 | 3/1990 | Tyburski et al. | 342/42 |
| 5,144,553 | 9/1992 | Hassett et al. | 340/928 |
| 5,150,114 | 9/1992 | Johansson | 340/825.54 |
| 5,289,183 | 2/1994 | Hassett et al. | 340/905 |

FOREIGN PATENT DOCUMENTS

| 54-99887 | 8/1979 | Japan . |
| 58-62784 | 4/1983 | Japan . |
| 61-129928 | 6/1986 | Japan . |
| 62-243092 | 10/1987 | Japan . |
| 62-294347 | 12/1987 | Japan . |
| 63-52082 | 3/1988 | Japan . |
| 1152599 | 6/1989 | Japan . |
| 1259484 | 10/1989 | Japan . |
| 230652 | 2/1990 | Japan . |
| 293390 | 4/1990 | Japan . |
| 2171677 | 7/1990 | Japan . |
| 2208587 | 8/1990 | Japan . |
| 4123190 | 4/1992 | Japan . |

*Primary Examiner*—Ian J. Lobo
*Attorney, Agent, or Firm*—Cushman, Darby & Cushman

[57] ABSTRACT

The primary object of the invention is to realize a mobile object identification system of simple construction and low cost, in which the responding unit attached to a mobile object writes data only once when it receives write signals repeatedly in communication with antenna units. When a tag unit (responding unit) receives a write signal from a writing antenna unit, it writes data to the data memory when a completion flag is cleared. When the data is first written, a control circuit sets the completion flag. Then, if the tag unit receives additional write signals in the communication area of the same writing antenna unit, the control circuit invalidates the data write command on the ground that the completion flag is set, thereby preventing duplicate data writing.

6 Claims, 27 Drawing Sheets

FIG. 9
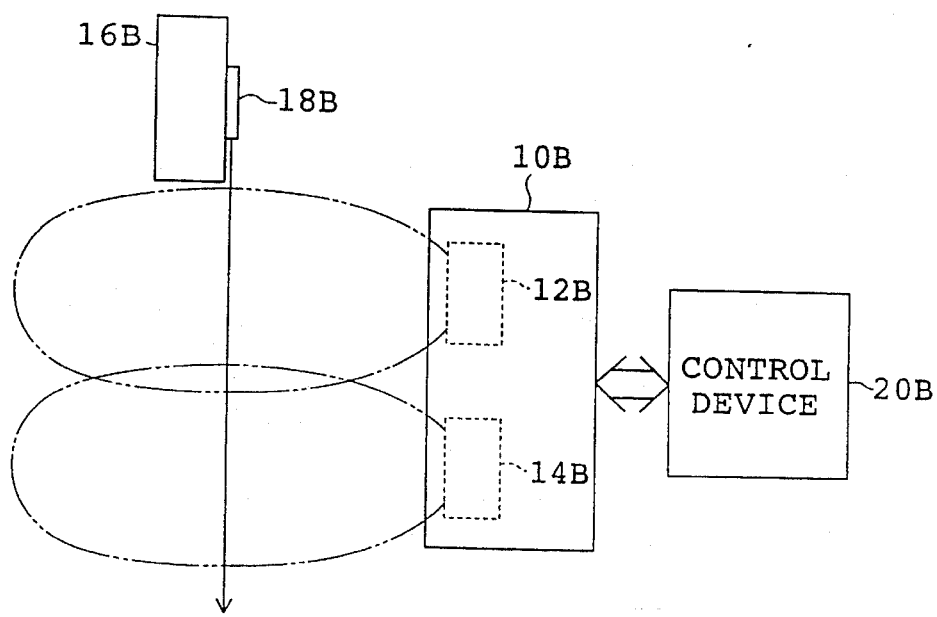
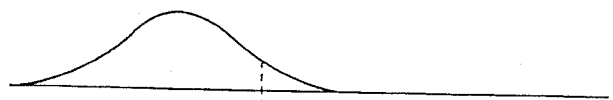
FIG. 10A  DETECTION OUTPUT OF FIRST STATIONARY ANTENNA
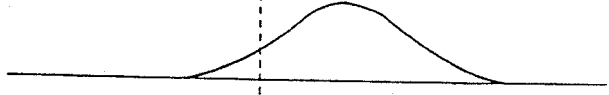
FIG. 10B  DETECTION OUTPUT OF SECOND STATIONARY ANTENNA
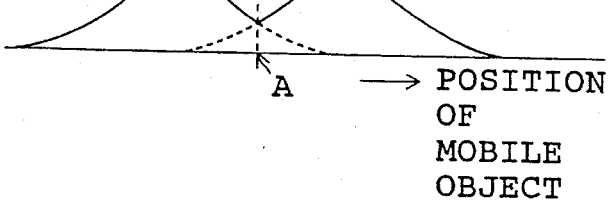
FIG. 10C  SELECTIVE DETECTION OUTPUT
→ POSITION OF MOBILE OBJECT FIG. 14
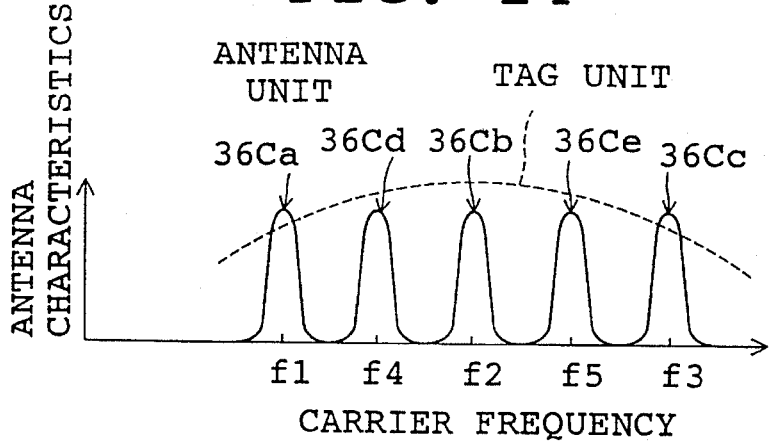
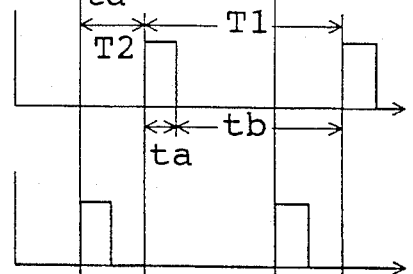
FIG. 15A ANTENNA UNIT 36Ca
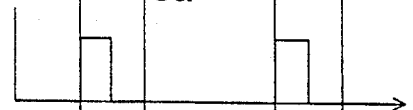
FIG. 15B ANTENNA UNIT 36Cb
FIG. 15C ANTENNA UNIT 36Cc
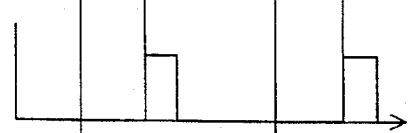
FIG. 15D ANTENNA UNIT 36Cd
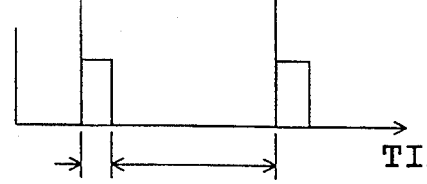
FIG. 15E ANTENNA UNIT 36Ce
INTERROGATORY SIGNAL OUTPUT PERIOD ta
RESPONSE SIGNAL RECEIVING PERIOD tb

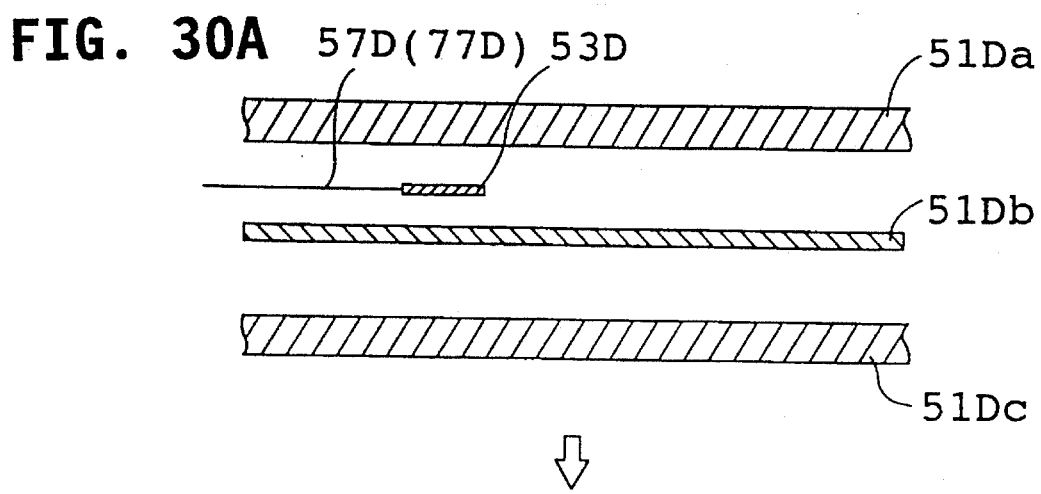
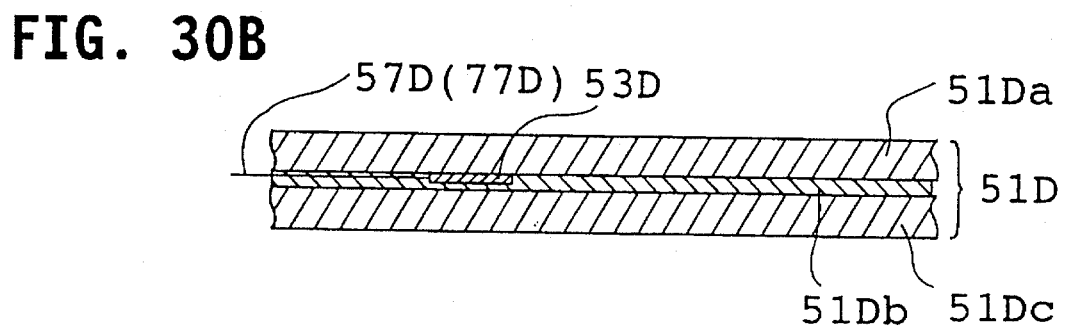
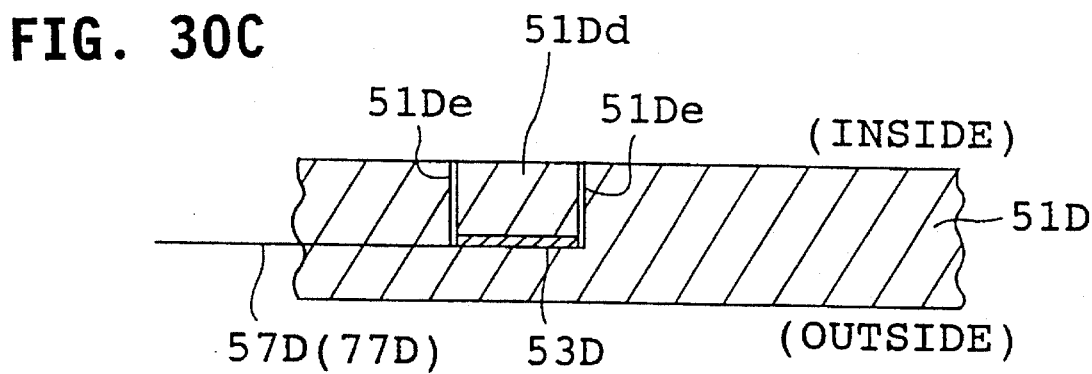

MOBILE OBJECT IDENTIFICATION SYSTEM

FIELD OF THE INVENTION

The present invention relates to a mobile object identification system for identifying a responder mounted on a mobile object in a communication area by transmitting interrogatory signals from an interrogator to the responder and receiving responding signals from the responder.

BACKGROUND OF THE INVENTION

A mobile object identification system transmits interrogatory signals from an interrogator to a responder attached to a mobile object and receives responding signals from the responder, thereby identifying the responder. Recently, there has been demand for mobile object identification systems that can assure accurate communication between interrogator and responder.

BRIEF SUMMARY OF THE INVENTION

To meet this demand, the first object of the invention (first invention) is to provide a responder for a mobile object identification system that, in the communication area of a writing interrogator, can write data upon receipt of a write signal and that, in the communication range of a reading interrogator, can read and transmit necessary data upon receipt of a read signal as it moves with the mobile object. The responder according to this invention comprises: data storage means for writing or reading necessary data; control means for controlling the processing for writing data to or reading data from the data storage means; and status storage means for storing the write completion status when necessary data has been written to the data storage means under control of the control means, so as to respond to a write signal received from the writing interrogator. The control means invalidates the processing for writing data when, with the write completion status retained in the status storage means, it receives a write signal from the writing interrogator.

According to the first invention, when the responder of the mobile object identification system receives a first write signal in the communication area of the writing interrogator, the control means writes the necessary data to data storage, and the status storage means ensures storage of the write completion status data. In this state, if the responder receives a second write signal from the writing interrogator, the control means invalidates the signal, since the write completion status data is already stored.

For various reasons, the mobile object may move slowly or stop in the communication area of the writing interrogator. In such a case, the responder attached to the mobile object receives the write signal repetitively from the writing interrogator. With the responder of the first invention, since the control means invalidates processing for writing the second and subsequent write signals, it allows a write signal to be written only once. Even if a plurality of responders are positioned in the same communication area, each responder operates as described above so that a write signal is written only once in each responder.

The second object of the invention (second invention) is to provide a mobile object identification system communication complex comprising: a responder for transmitting/receiving signals through the mobile antenna mounted on a mobile object; an interrogator for transmitting/receiving signal through a plurality of stationary antennas installed along the moving area of the mobile object; and a control device for controlling operation of the interrogator. The interrogator includes a level judging circuit to identify the highest-level responding signal of those received by the stationary antennas, and a signal selection circuit to selectively output to the control device the responding signal identified by the level judging circuit.

According to the communication complex of the second invention, the interrogator transmits interrogatory signals through the antennas. When the mobile object enters the communication area, the responder mounted on the mobile object transmits a responding signal in response to the interrogatory signal received.

Since the interrogator has the plurality of antennas installed along the moving area of the mobile object, the responder communicates with the plurality of antennas simultaneously. The level judging circuit of the interrogator identifies the highest-level responding signal of all the signals received by these antennas, and the level selection circuit selectively outputs to the control device the responding signal identified by the level judging circuit, enabling the control device to read the highest-level responding signal without switching antennas.

The third object of the invention (third invention) is to provide a mobile object identification system comprising a responder mounted on a mobile object, which responder, when receiving an interrogatory signal in a specified frequency band, with a responding signal, modulates the unmodulated carrier wave received after the interrogatory signal, and transmits the responding signal-modulated carrier wave. Each of a plurality of interrogators modulate, with the interrogatory signal, the carrier wave in the specified frequency band allocated for each of the communication areas of the plurality of interrogators, transmit the interrogatory signal-modulated carrier wave, followed by unmodulated carrier wave, to the appropriate communication area. Each interrogator also receives the responding signal from the responder positioned in the appropriate communication area. A control means controls the plurality of interrogators so that at least those interrogators whose communication areas overlap transmit carrier waves in different frequency bands and transmit interrogatory signals at different timings.

According to the mobile object identification system of the third invention, when the responder mounted on the mobile object is in any one of the plurality of communication areas provided by the plurality of interrogators, the appropriate interrogator transmits the interrogatory signal; the responder receives the interrogatory signal, generating a responding signal in response. The carrier wave received after the interrogatory signal is then modulated by the responding signal, and the responder transmits the responding signal-modulated carrier wave. The interrogator receives this wave, thereby identifying the responding signal.

When the responder is located in the zone where communication areas overlap, the corresponding interrogators transmit interrogatory signals at different frequencies and different timings via the control means, so that the responder receives one interrogatory signal from any of the interrogators at a time. Thus, the responder accepts the interrogatory signal received first, generates a responding signal which modulates the carrier wave received after the interrogatory signal, and transmits the responding signal-modulated carrier wave.

At this time, it is possible that the responding signal-modulated carrier wave is received by the two interrogators whose communication areas overlap the appropriate one. Even in such a case, the responder can communicate with the appropriate interrogator without radio interference, due to the difference in frequency of the responding signal-modulated carrier wave from the frequency allocated for the other interrogator. In addition, according to the present invention, unlike in conventional cases, where the communication period is time-shared by multiple interrogators, radio waves can be transmitted simultaneously in the zone where communication areas overlap. Consequently, the responder mounted on the mobile object can communicate with an appropriate interrogator promptly and accurately, even when moving at high speed.

The fourth object of the invention (fourth invention) is to provide an electronic label for the mobile object identification system comprising: a responding circuit in which is stored vehicle information such as the frame number (e.g., vehicle identification number (VIN)), and which outputs the vehicle information in response to an interrogatory signal received from an interrogator. Information given on the surface of the electronic label is that found on such labels that are legally required to be attached to a vehicle.

When an interrogatory signal is sent from an external interrogator to the vehicle to which the electronic label of the fourth invention is attached, the responding circuit receives the interrogatory signal, and returns the preliminarily loaded vehicle information. Therefore, the vehicle information need not be checked visually. Even if the vehicle is often running past without stopping, the vehicle information can be recognized easily.

When the electronic label bears on the surface the same particulars as given on a mandatory vehicle inspection label or a regular check and maintenance label legally attached to the windshield glass of the vehicle, the electronic label can be attached to the windshield glass without causing any problems. This position is also the optimum for electronic label reception of interrogatory signals transmitted from ahead of or above the vehicle. For a vehicle to be driven on public roads, it is legally required to have such vehicle inspection label or regular check and maintenance label attached. Therefore, such a label is not to be removed. Accordingly, the information read from the electronic label attached to the windshield glass of a vehicle can be considered as information specific to the vehicle.

The fifth object of the invention (fifth invention) is to provide another electronic label for the mobile object identification system comprising: a responding circuit in which is stored vehicle information such as the frame number and which outputs the vehicle information in response to an interrogatory signal received from an interrogator, the responding circuit being embedded in the windshield or window glass.

When an interrogatory signal is sent from an external interrogator to a vehicle equipped with the electronic label of the fifth invention, the responding circuit embedded in the window glass receives the interrogatory signal and returns the preliminarily written vehicle information. Therefore, as with the fourth invention, the vehicle information need not be checked visually, and can be recognized easily if the vehicle is running past without stopping.

BRIEF DESCRIPTION OF THE DRAWINGS

FIG. 9 is a schematic view explaining the general concept of the second invention;

FIGS. 10A to 10C are a chart showing change in signal level of the responding signals by the second invention as a mobile object is moving;

FIG. 14 is a chart showing the frequency characteristics of the interrogator and responder of the third invention;

FIGS. 15A to 15E are a timing chart of interrogatory signal outputs of the third invention;

FIGS. 30A to 30C are sectional views of window glass for explaining the method of embedding the responding circuit of the fifth invention in the window glass;

BEST MODE FOR CARRYING OUT THE INVENTION

Prior to explaining the first invention, the conventional art as opposed to the first invention and its problems will be described in detail in the following.

A mobile object identification system has many applications, one of which is in the system for managing unmanned trucks in a factory. This system comprises a tag unit mounted as a responding unit on each unmanned truck, and antenna units installed along the passage of unmanned trucks to provide communication areas for communication with tag units. Each tag unit of this system includes a memory for storing various data, such as the identification code, quantities and destinations of the articles being transported by the unmanned truck. This memory is designed to enable readout of stored data and write-in of new data, as necessary.

Each antenna unit is designed to transmit a carrier wave of specified frequency as modulated by an interrogatory signal, and then an unmodulated carrier wave to its communication area. As an unmanned truck moves, the tag unit attached to the truck enters a communication area and receives an interrogatory signal. The tag unit then generates a responding signal containing various data such as article identification code, to answer the interrogatory signal, via a responding signal, modulates the unmodulated carrier wave received following the interrogatory signal, and transmits the responding signal-modulated carrier.

The antenna unit receives the responding signal, by which it identifies the tag unit of the unmanned truck passing through the communication area, and recognizes the articles being carried by the truck. According to this information, the antenna unit stores new data and/or controls the operation of the unmanned truck, as necessary.

Some of such conventional mobile object identification systems use a data memory composed of nonvolatile memory such as EEPROM, for the responding unit. Generally, a significant amount of time is needed to write data to a nonvolatile memory. When the interrogatory signal from an antenna unit includes a data write command, therefore, the processing for writing data to the data memory takes an extended time. When the unmanned truck is moving at a high speed, the tag unit could therefore pass through the communication area before it can read data written to its data memory and send it to the interrogating unit, thus hampering accurate communication.

Figure 4:
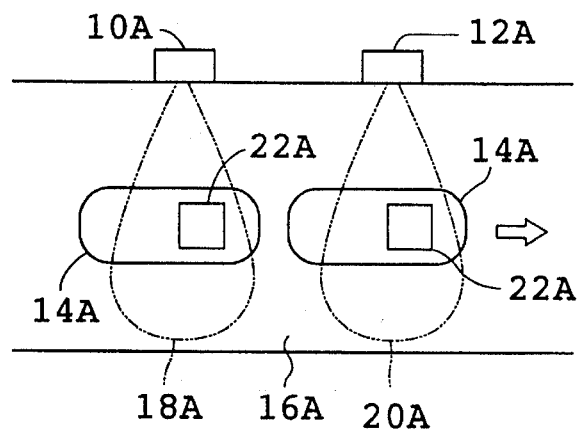
FIG. 4 is a schematic view explaining conventional art as opposed to the first invention.

One conventional device attempts to solve this problem with a mobile object identification system in which an antenna unit is divided into a writing antenna unit 10A and a reading antenna unit 12A, which are arranged in that order along the passage 16A of an unmanned truck 14A, as illustrated in FIG. 4. The writing antenna unit 10A transmits write signals to the unmanned truck 14A in the communication area 18A, and the reading antenna unit 12A, installed at a downstream position, transmits read signals the unmanned truck 14A in the communication area 20A. Therefore, if the tag unit 22A, attached to the unmanned truck 14A, takes time in writing data to its data memory, tag unit 22A can complete the processing for writing data before it enters the communication area 20A of the reading antenna unit 12A. In other words, if the unmanned truck 14A is moving at a high speed, the system can identify the truck through accurate communication between the tag unit and antenna units.

However, this conventional art also has a drawback. The unmanned truck 14A may stop in the communication area 18A of the writing antenna unit 10A for a certain reason. In such a case, the tag unit 22A attached to the unmanned truck 14A repeatedly receives a write signal transmitted from the writing antenna unit 10A. If the write signal includes a write command for such data as the number of transits, the number of transits will be written and updated every time the write signal is received. Consequently, the wrong number of transits is stored in the tag unit 22A.

Figure 5:
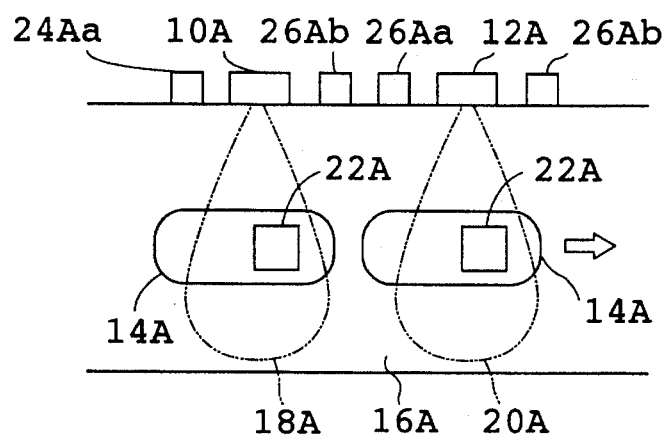
FIG. 5 is a schematic view explaining another conventional device as opposed to the first invention.

The system shown in FIG. 5 solves this problem. According to this arrangement, object detectors 24Aa, 24Ab, 26Aa and 26Ab are installed before and after the antenna units 10A and 12A, respectively, to detect an object. That is, these detectors detect the tag unit 22A if it is in the communication area 18A or 20A of the antenna unit 10A or 12A. With this arrangement, the system calculates that the unmanned truck 14A exists in the communication area 18A or 20A for the period from the time when it is detected by the object detector 24Aa or 26Aa to the time when it is detected by the object detector 24Ab or 26Ab. Therefore, the system with this arrangement can solve the above-mentioned problem by controlling antenna unit 10A or 12A to transmit a write signal only once, when the unmanned truck 14A enters and stays in the communication area 18A or 20A.

Figure 6:
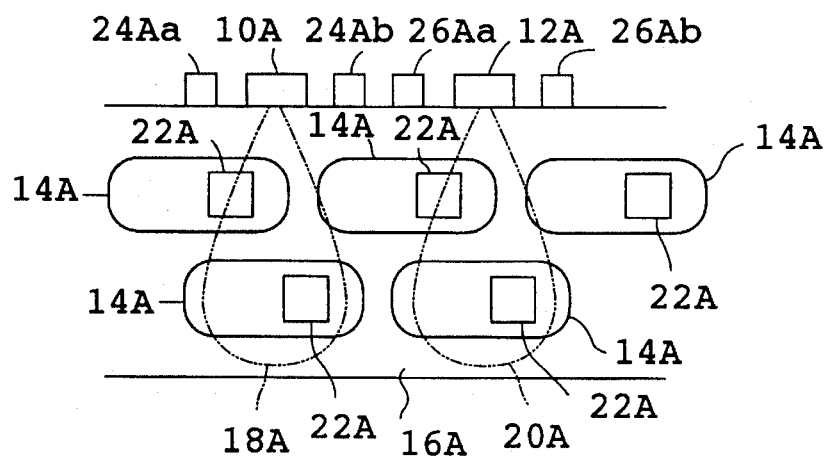
FIG. 6 is a schematic view explaining the disadvantages of the conventional art as opposed to the first invention.

This arrangement, however, also has a drawback. There is no problem as long as unmanned trucks 14A with tag units 22A pass one by one through the communication area 18A or 20A. However, two unmanned trucks 14A may pass through the communication area 18A or 20A simultaneously, as shown in FIG. 6. In such a case, since the antenna unit 10A or 12A is controlled to transmit a write signal only once, it transmits a write signal to the tag unit 22A entering the communication area 18A or 20A first, but not to the tag units 22A entering the communication area later.

If the antenna unit 10A or 12A transmits a write signal two times when the object detector 24Aa or 26Aa detects two unmanned trucks 14A in the communication area 18A or 20A, the tag unit 22A entering the communication area first will receive the write signal two times, resulting in duplicate writing.

The first invention has solved the above-mentioned problems of the conventional arts. An embodiment of the first invention is described in detail with reference to FIGS. 1 through 3 below. In this embodiment, the first invention is applied to a tag unit for use in the communication system for unmanned trucks.

Figure 2:
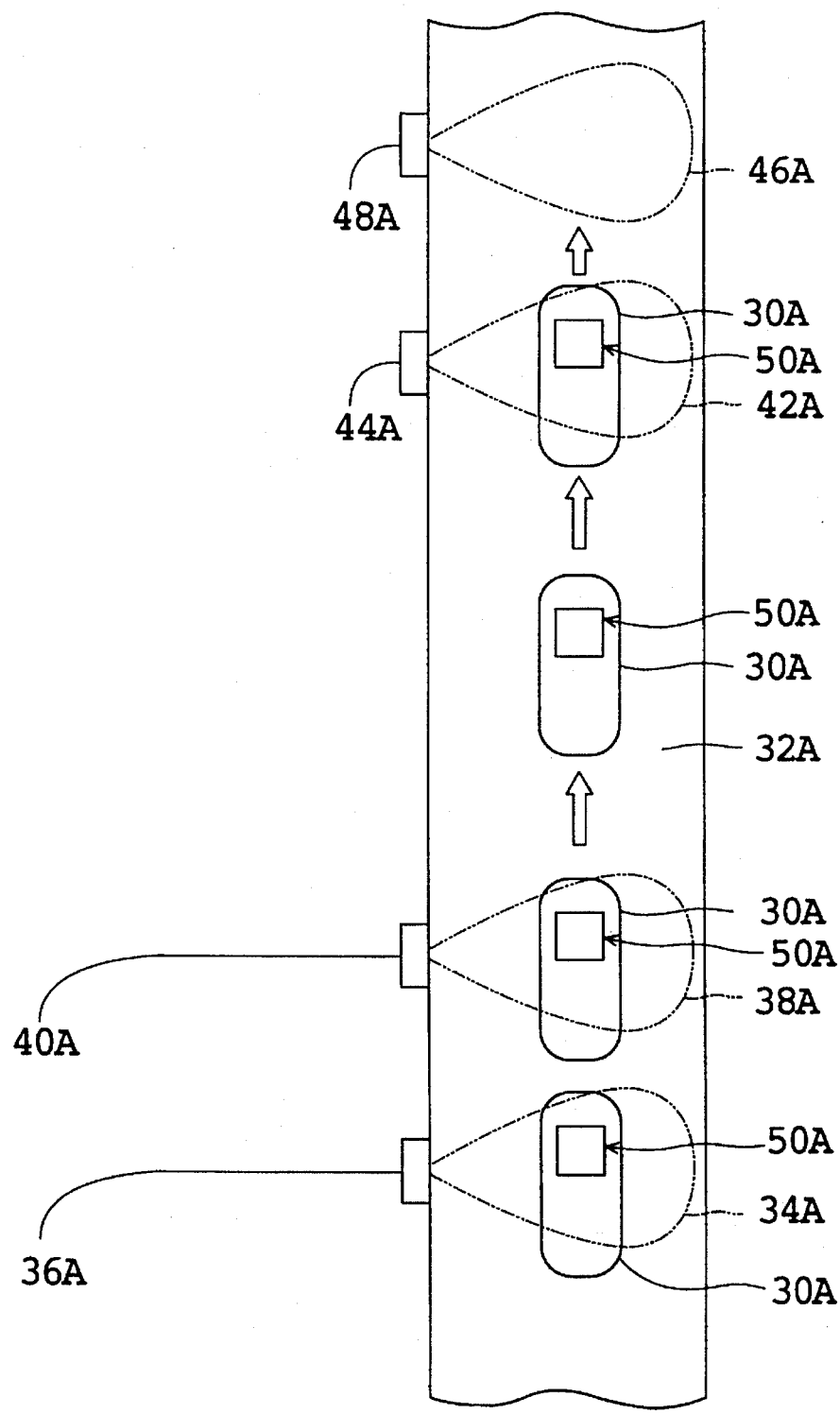
FIG. 2 is a schematic view explaining the general concept of the first invention.

In FIG. 2, that shows the general concept of the first invention, an unmanned truck 30A as a mobile object is controlled by a control device (not shown) to move along a passage 32A. The truck 30A loaded with articles is expected to run along the passage 32A in the direction of arrows toward a specified destination.

A writing antenna unit 36A providing a communication area 34A, and a reading antenna unit 40A providing a communication area 38A are installed in that order at specified adjacent positions along the passage 32A. A writing antenna unit 44A providing a communication area 42A and a reading antenna unit 48A providing a communication area 46A are also installed in that order at specified adjacent positions along the passage 32A downstream from the antenna units 36A and 40A. Accordingly, when the unmanned truck 30A runs along the passage 32A, it passes through the communication areas 34A, 38A, 42A and 46A in that order.

The unmanned truck 30A is provided with a tag unit 50A as a responder of the present invention, so that it communicates with the antenna units 36A, 40A, 44A and 48A in the communication areas 34A, 38A, 42A and 46A, respectively, as will be described later.

Each of the antenna units 36A, 40A, 44A and 48A comprises batch antennas realized by microstrip lines formed on PC boards; these batch antennas are arranged in multiple groupings as an array antenna to improve the directivity and to accommodate long-distance communication. To transmit write/read signals, the antenna units 36A, 40A, 44A and 48A use semi-microwaves in a frequency band of, for instance, 2.45 GHz as carrier waves.

The antenna units 36A, 40A, 44A and 48A transmit the above-mentioned carrier waves as modulated by a write/read signal during the write/read signal transmission period, and transmit unmodulated carrier waves during the other period. While the antenna unit 36A, 40A, 44A or 48A is transmitting an unmodulated carrier wave, it receives radio waves sent from the tag unit 50A in the communication area 34A, 38A, 42A or 46A.

Figure 3:
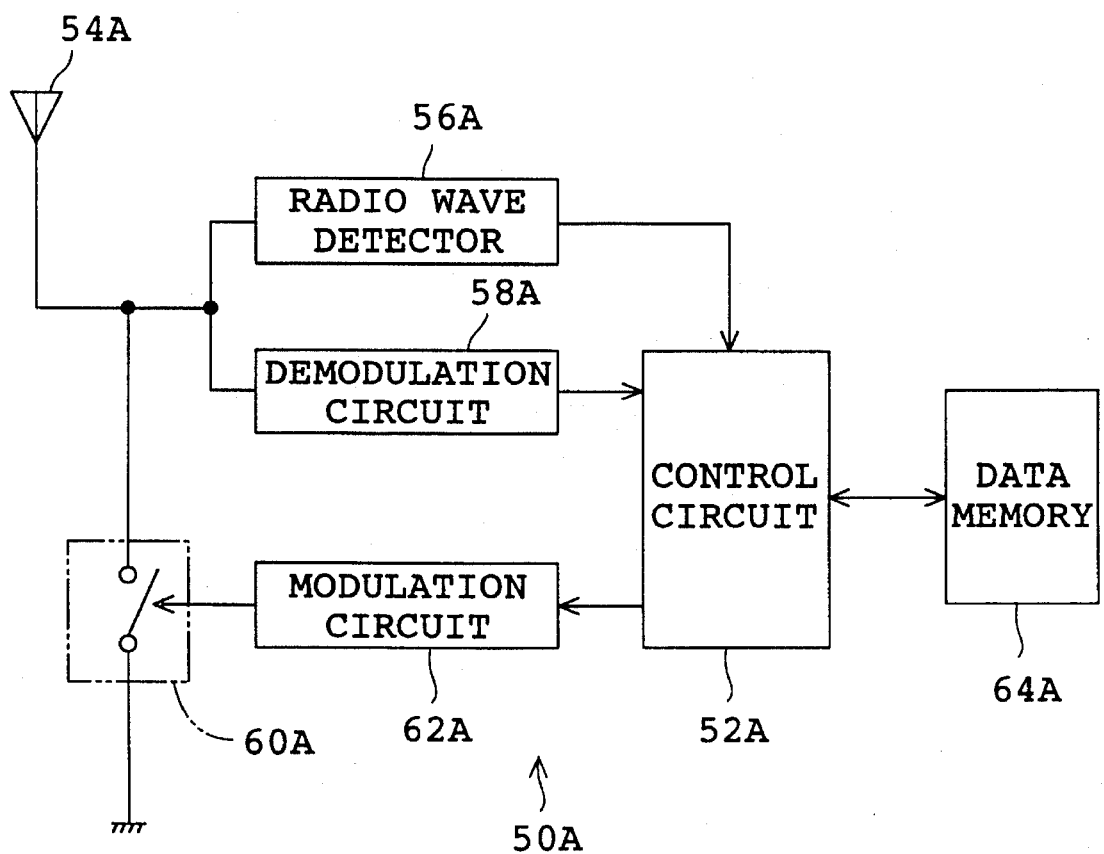
FIG. 3 is a block diagram showing the electrical construction of the first invention.

FIG. 3 shows the electrical construction of the tag unit 50A, a control circuit 52A includes a CPU, ROM and RAM as control means. The control circuit 52A stores a control program (described later) for controlling communication as well as for use as a status storage means (also described later). An antenna 54A is composed of, for example, batch antennas realized by microstrip lines formed on PC boards.

The antenna 54A is connected to the control circuit 52A in two ways: through a radio wave detector 56A and through a demodulation circuit 58A. The antenna 54A is grounded via a switch circuit 60A. The control pin of the switch circuit 60A is connected to the control circuit 52A through a modulation circuit 62A. The radio wave detector 56A detects the radio wave received by the antenna 54A, and outputs the detection data to the control circuit 52A. The demodulation circuit 58A demodulates the radio wave received by the antenna 54A, and outputs the demodulated wave as a reception signal to the control circuit 52A. The modulation circuit 62A modulates the carrier wave by opening/closing the switch circuit 60A according to the responding signal output from the control circuit 52A.

A data memory 64A connected to the control circuit 52A forms data storage means. The data memory 64A is composed of a nonvolatile memory such as an EEPROM. The control circuit 52A executes the processing for writing or reading various data into or out of the data memory 64A as required. All these circuits of the tag unit 50A are fed with power by a battery (not shown).

Figure 1:
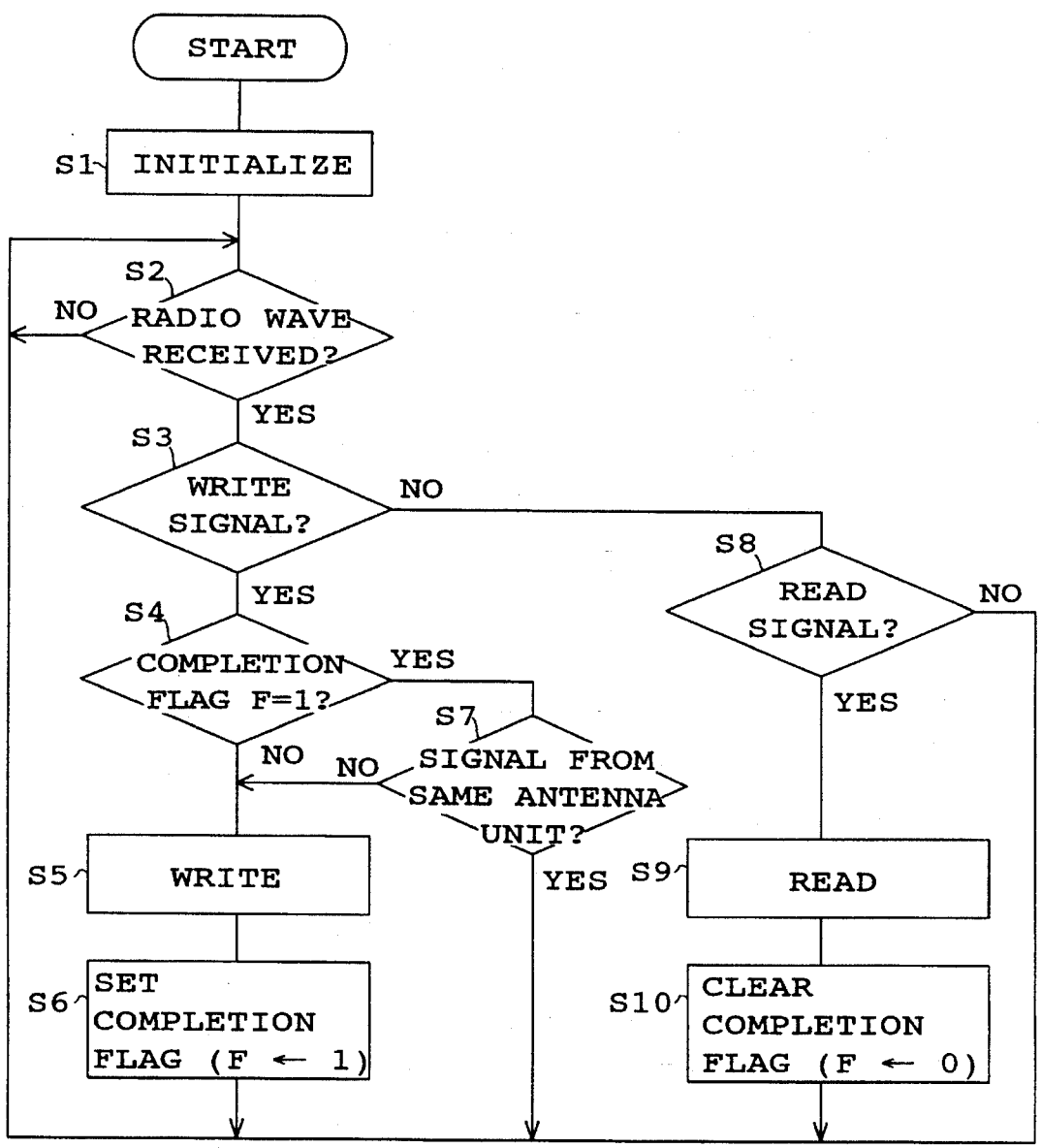
FIG. 1 is a flow chart of the control program for an embodiment of the responder according to the first invention.

The operation of this embodiment of the first invention is described with reference to the flow chart of FIG. 1. When power is supplied, the control circuit 52A of the tag unit 50A starts running the communication control program shown in FIG. 1. Specifically, after initialization (step S1), the control circuit 52A is put in the wait state until it receives a radio wave in step S2. In the above initialization step, various registers and flags are cleared for initial setting. The completion flag F, as the status storage means, is also cleared in step S1 (F←0).

When the unmanned truck 30A moves into the communication area 34A of the writing antenna unit 36A, the antenna 54A of the tag unit 50A receives a write signal transmitted from the writing antenna unit 36A. The radio wave detector 56A detects this write signal, and outputs a detection signal to the control circuit 52A. Based on the detection signal, a control circuit 52A makes a judgment of "YES" in step S2, and advances the program to step S3, to check if the radio wave received is a write signal. Since the control circuit 52A receives a reception signal as opposed to the write signal from the demodulation circuit 58A, it makes the judgment for "YES" in step S3, and advances the program to step S4.

In step S4, the control circuit 52A checks if the completion flag F has been set. Since the completion flag F has not yet been set (F=0), the control circuit 52A makes a judgment of "NO", and advances the program to step S5 where necessary data is written to the data memory 64A. Then, after setting the completion flag F (F←1) in step S6, the program returns to step S2.

The data writing process in step S5 takes longer than other processing. Therefore, if the unmanned truck 30A is moving at ordinary speed, the tag unit 50A may complete data writing by the time the unmanned truck 30A leaves the communication area 34A of the writing antenna unit 36A.

If the unmanned truck 30A is moving at low speed, the tag unit 50A may still be in the communication area 34A of the writing antenna unit 36A when it has completed data writing. In such a case, the tag unit 50A receives a write signal again. However, when the program proceeds through steps S2 and S3 to step S4, the control circuit 52A makes the judgment of "NO" because the completion flag F has already been set (F=1), and the program is advanced to step S7. In step S7, since the write signal received the second time is transmitted from the same writing antenna unit that sent the first write signal, the control circuit 52A makes the judgment of "YES," and the program returns to step S2. In other words, since data writing is already executed, the control circuit 52A invalidates the second or subsequent write data.

When the unmanned truck 30A enters the communication area 38A of the reading antenna unit 40A, the tag unit 50A operates as follows. The control circuit 52A runs the program through step S2 to step S3 in the same procedure as already described, makes the judgment of "NO", and advances the program to step S8. Since the control circuit 52A has received a read signal from the demodulation circuit 58A, it makes the judgment of "YES" in step S8. The program is advanced to the step S9 where the control circuit 52A carries out the data reading process. After the completion flag F is cleared (F←0) in step S10, the program returns to step S2.

By the data reading process in step S9, the control circuit 52A reads to check data recorded, for example, by the write processing in the data memory 64A, for transmission to the reading antenna unit 40A. To transmit the data thus read, the control circuit 52A sends it as a responding signal to the modulation circuit 62A, which carries out modulation using the responding signal, and controls the ON/OFF state of the switch circuit 60A.

The unmodulated carrier wave sent from the reading antenna unit 40A and received by the antenna 54A is thus reflected or absorbed, and transmitted back to the reading antenna unit 40A. The reading antenna unit 40A receives the radio wave transmitted from the communication area 38A while it is sending an unmodulated carrier wave. The radio wave thus received is demodulated to obtain a responding signal.

In step S8, if the radio wave received by the antenna 54A is neither a write signal nor a read signal, the control circuit 52A makes the judgment of "NO," assuming that the radio wave is transmitted from a source other than the antenna unit 36A or 40A. The program then returns to the step S2.

If the unmanned truck 30A stops in the communication area 34A of the writing antenna unit 36A for some reason, the tag unit 50A will receive a write signal repeatedly. According to the present invention, once the control circuit 52A has carried out the data writing process, it invalidates the second and subsequent write signals, and does not conduct data writing any more. Therefore, the problem of duplicate data writing does not occur.

If more than one unmanned truck 30A are positioned in the communication area 34A each, receiving a write signal repeatedly from the writing antenna unit 36A, the tag unit 50A of each unmanned truck 30A carries out the data writing process only once, due to the above-mentioned means of the control circuit 52A.

According to the present invention, the unmanned truck 30A is controlled to pass through the communication area 34A of the writing antenna unit 36A prior to the communication area 38A of the reading antenna unit 40A. Normally, therefore, as the unmanned truck 30A runs through the passage and moves out of the communication area 38A, the completion flag F is set in step S6 and cleared in step S10 by the control circuit 52A. Accordingly, when the unmanned truck 30A enters the communication area 42A of another writing antenna unit 44A, the tag unit 50A carries out the data writing process only once.

However, if more than one unmanned truck 30A are running in parallel through, for example, the communication area 38A of the reading antenna unit 40A, it is possible that the tag unit 50A of a truck behind the other truck does not receive a read signal sent from the reading antenna unit 40A.

When the unmanned truck 30A that has received a read signal in the communication area 38A enters the communication area 42A of the writing antenna unit 44A and receives a write signal there, the control circuit 52A of the tag unit 50A carries out the data writing process as follows. The program is advanced through steps S2 and S3 to step S4. Since the completion flag F is not cleared (F=1), the control circuit 52A makes the judgment of "YES" in step S4, and advances the program to step S7. Since the tag unit 50A receives a write signal from the writing antenna unit 44A and not from the writing antenna unit 36A, the control circuit 52A makes the judgment of "NO" in step S7 and advances the program to step S5 where data is written.

Thus, according to this invention, when the tag unit 50A receives a write signal from the writing antenna unit 36A or 44A, the control circuit 52A executes a data writing process, and sets the completion flag F to invalidate any write process by the second or subsequent write signal, thereby preventing duplicate data writing to the data memory 64A. Even if more than one tag unit 50A exist in the communication area 34A or 42A, each tag unit 50A carries out the data writing process only once.

In addition, according to the present invention, the control circuit 52A checks in step S7 if the write signal received has been sent from the same writing antenna unit as the last write signal, and writes data if it makes the judgment of "NO". Therefore, even if the tag unit 50A has not received a read signal from the reading antenna unit 40A or 48A, it can write data without fail when it receives a write signal.

In the above-mentioned embodiment of the first invention, the data memory 64A uses an EEPROM as data storage. A battery-backup RAM or other memory, such as a so-called IC card, can be used instead of the EEPROM without departing from the spirit of the present invention.

In the above embodiment, the invention is applied to the tag unit for the system of identifying unmanned trucks. The invention is also applicable to the responding unit of any other mobile object identification system. For example, it may be applied to the tag unit for the process control system in a factory to control production by attaching the tag unit to each product in the line. It is also applicable to the ID card for a system of managing persons entering/exiting a room.

Now, prior to explaining the second invention, the conventional art as opposed to the second invention and its problems will be described in detail in the following.

Various communication complexes have been in operation for mobile object identification systems. A typical example is a complex in which an interrogator transmits an interrogatory signal to communicate with a responder attached to each product being carried on a conveyor line, receives a responding signal sent from the responder, and outputs it to a control device for data processing.

In particular, the interrogator sends an interrogatory signal through an antenna. When a mobile object enters the communication area, the responder attached to the mobile object receives the interrogatory signal through an antenna, and transmits a signal in response to the interrogatory signal. The interrogator receives the responding signal and outputs it to the control device which processes the responding signal, and sends the processed data to a host computer when necessary.

Recently, the quantity of communication data to be handled by such a communication system has been expanding with the increase in operating speed of conveyor lines, causing communication time shortage. Conventionally, this problem is overcome by installing multiple antennas of the interrogator along the moving passage of products and outputting a responding signal from each of the antennas to the control device. The control device selects the antenna receiving the highest level responding signal.

With the above-mentioned conventional method, however, the control device is required to switch antennas while reading the responding signals output from the interrogator. During the antenna switching period, the control device cannot read a responding signal, so data communication is interrupted.

The second invention has solved the above-mentioned problems of the conventional art. An embodiment of the second invention will be described in detail below.

FIG. 9, that shows the general concept of the second invention. An interrogator 10B has a first stationary antenna 12B and a second stationary antenna 14B, and transmits interrogatory signals selectively through the first and second stationary antennas 12B and 14B. A responder 18B is attached to a mobile object 16B. The first and second stationary antennas 12B and 14B are installed along the moving area of the mobile object 16B. The communication area of each of the stationary antennas 12B and 14B is indicated by the chain double-dashed line. The interrogator 10B can communicate with the responder 18B when the mobile object 16B is positioned in either of the communication areas.

The communication areas of the first and second stationary antennas 12B and 14B overlap. The interrogator 10B is designed to transmit interrogatory signals as controlled by a control device 20B, and to output responding signals received from the responder 18B to the control device 20B.

Figure 7:
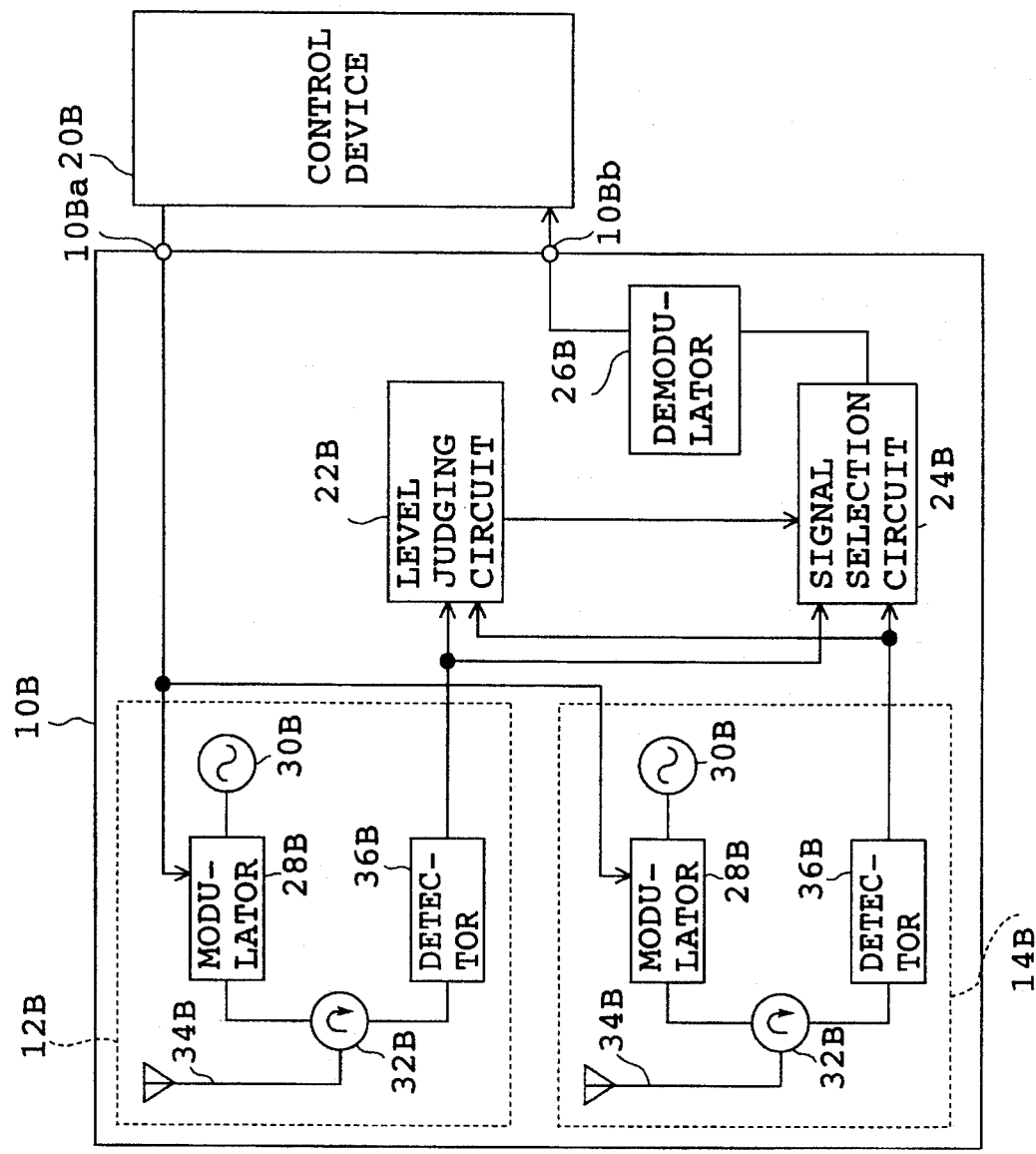
FIG. 7 is a block diagram showing the construction of the interrogator used in an embodiment of the communication complex according to the second invention.

FIG. 7 shows the construction of the interrogator 10B, the interrogator 10B is connected to the control device 20B through an input pin 10Ba and an output pin 10Bb. The interrogator 10B comprises a level judging circuit 22B, a signal selection circuit 24B and a demodulator 26B in addition to the first and second stationary antennas 12B and 14B.

Since the first and second stationary antennas 12B and 14B are of the same construction, the first stationary antenna 12B alone will be described in the following, with the description for the second stationary antenna 14B omitted. The first stationary antenna 12B comprises a modulator 28B, an oscillator 30B, a circulator 32B, a detector 36B and a microstrip antenna 34B. When an interrogatory signal is input from the control device 20B through the input pin 10Ba, the modulator 28B modulates the interrogatory signal by a carrier signal given from the oscillator 30B, and outputs the modulated signal through the circulator 32B to the microstrip antenna 34B. When a responding signal is received by the microstrip antenna 34B, the detector 36B detects the signal through the circulator 32B, and outputs it to the level judging circuit 22B.

The level judging circuit 22B is designed to receive responding signals from both first and second stationary antennas 12B and 14B. The circuit 22B judges the signal level of each responding signal received, to identify the higher level responding signal, and sends the judgment result to the signal selection circuit 24B. The signal selection circuit 24B is also designed to receive responding signals from both first and second stationary antennas 12B and 14B. Based on the judgment result from the level-judging circuit 22B, the signal selection circuit 24B selects the higher level responding signal, and outputs it to the control device 20B through the demodulator 26B and the output pin 10Bb.

The control device 20B controls commands to be output from the interrogator 10B to the responder 18B, and the operation time of the interrogator 10B. In addition, the control device 20B processes data received from the responder 18B, and outputs processed data to a host computer (not shown) or a display unit (not shown) as necessary.

Figure 8:
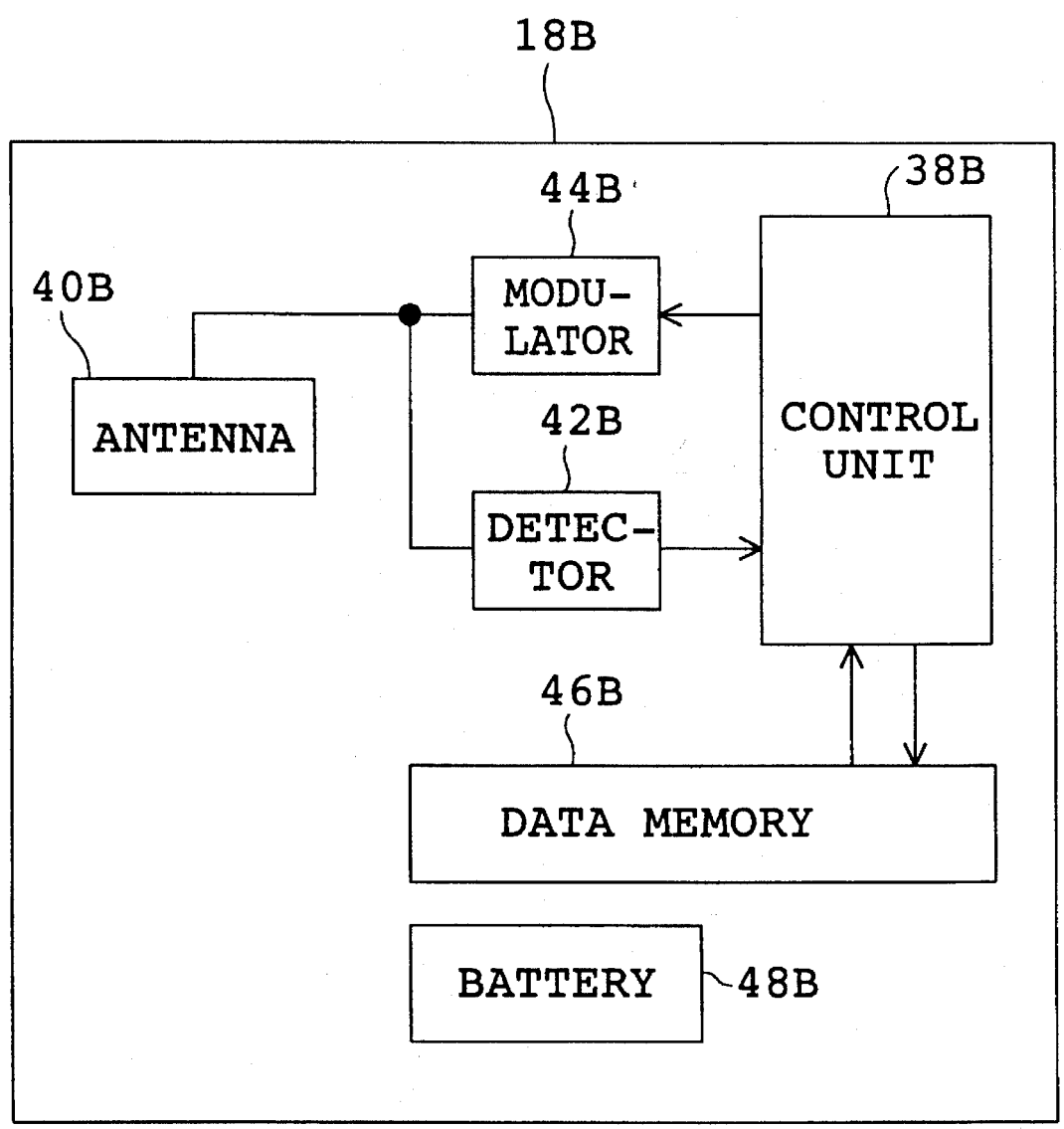
FIG. 8 is a block diagram of the responder used in the second invention.

FIG. 8 shows the construction of the responder 18B. The interrogatory signal received by a mobile antenna 40B is input through a detector 42B to a control unit 38B. The mobile antenna 40B is composed of a microstrip antenna. The control unit 38B outputs a responding signal in reply to the interrogatory signal to the microstrip antenna 40B through a modulator 44B which modulates the responding signal. In addition, the control unit 38B interchanges data with a data memory 46B. Each component of the responder 18B is fed with power by a battery 48B.

Now, the operation of the second invention, having the above-mentioned construction, will be described.

The control device 20B outputs interrogatory signals intermittently to the interrogator 10B, so that the first and second stationary antennas 12B and 14B transmit the interrogatory signals.

When the mobile object 16B enters the communication area of the first stationary antenna 12B, the responder 18B attached to the mobile object 16B receives an interrogatory signal through the mobile antenna 40B. The responder 18B then transmits a responding signal, indicating its own identification number, through the mobile antenna 40B. The first stationary antenna 12B of the interrogator 10B receives the responding signal, and outputs it through the detector 36B to the level judging circuit 22B.

At this time, the responding signal from the responder 18B is also received by the second stationary antenna 14B and input to the level judging circuit 22B. However, the responding signal from the second stationary antenna 14B has lower signal level than the responding signal from the first stationary antenna 12B. Accordingly, the level judging circuit 22B reckons that the responding signal input from the first stationary antenna 12B is higher, and outputs this result to the signal selection circuit 24B. Based on this result, the signal selection circuit 24B selects the responding signal from the first stationary antenna 12B, and outputs it to the demodulator 26B. The demodulator 26B demodulates the responding signal to obtain the identification number, and outputs it to the control device 20B.

The control device 20B checks if the identification number is appropriate. If it is, the control device 20B outputs an interrogatory signal containing a data write command or a data read command through the first and second stationary antennas 12B and 14B to communicate with the responder 18B.

The signal level of the responding signal received by the first stationary antenna 12B and input to the control device 20B changes as the mobile object 16B moves. FIG. 10A shows this change in the signal level.

As the mobile object 16B moves and enters the overlapping zone of the communication areas of the first and second stationary antennas 12B and 14B, the signal level of the responding signal from the second stationary antenna 14B becomes higher than that from the first stationary antenna 12B (at the timing indicated by "A") as shown by FIG. 10B. Then, the signal selection circuit 24B selects as shown by FIG. 10C the responding signal received from the second stationary antenna 14B, according to the instruction given by the level judging circuit 22B, and outputs the signal to the control device 20B. Accordingly, after the timing "A," the control device 20B controls data communication based on the responding signal from the second stationary antenna 14B.

According to this invention, as mentioned above, the level judging circuit 22B and signal selection circuit 24B enable the interrogator 10B to output to the control device 20B the higher level responding signal of the two signals received by the first and second stationary antennas 12B and 14B. Therefore, although the responding signals received by the first and second stationary antennas 12B and 14B change as the mobile object 16B moves, the control device 20B always receives the higher level responding signal.

Thus, unlike the conventional communication system in which a control device is provided with a means for selecting one of several stationary antennas, the control device 20B of the communication system according to the present invention does not contain an antenna-switching means. Consequently, communication between the interrogator 10B and the responder 18B can never be interrupted by an antenna-switching operation.

Before the mobile object identification equipment of the third invention is explained, the conventional art as opposed to the third invention and their problems will be described in detail in the following.

The mobile object identification system has many applications, one of which is for unmanned trucks in a factory.

This system comprises a tag unit mounted as a responding unit on each unmanned truck, and antenna units installed along the route of unmanned trucks to provide areas for communication with tag units. The tag unit of this system includes a memory to store various data, such as the identification code, quantities and destination of the articles being transported by the unmanned truck. This memory is designed to allow the stored data to be read, and new data to be written as necessary.

Each antenna unit is designed to transmit a carrier wave of a specified frequency as modulated by an interrogatory signal, and then an unmodulated carrier wave to its communication area. When an unmanned truck enters the communication area, the tag unit attached to the truck receives an interrogatory signal. The tag unit then generates a responding signal for various data, such as the article identification code, to answer the interrogatory signal, modulates the unmodulated carrier wave received following the interrogatory signal, using the responding signal, and transmits the responding signal-modulated carrier wave.

The antenna unit receives the responding signal, which enables the unit to identify the tag unit of the unmanned truck passing through its communication area, determine the articles being carried by the truck, store new data and/or control unmanned truck operation.

If unmanned trucks are allowed to move in a large area, it is necessary to set a wide communication area to cover the large moving area. In the conventional art, this requirement is met by dividing the wide communication area into blocks and installing a plurality of antenna units to cover the blocks.

Figure 18:
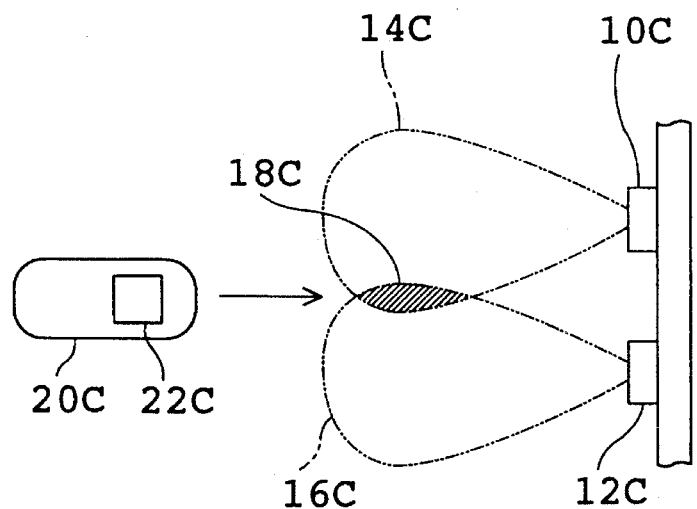
FIG. 18 is a schematic view explaining the disadvantage of conventional art as opposed to the third invention.

However, if the antenna units 10C and 12C are arranged so that the communication areas 14C and 16C overlap, as shown in FIG. 18, wave interference can occur. Specifically, if an unmanned truck 20C enters the overlapping zone 18C (in the direction indicated by the arrow), the tag unit 22C attached to the unmanned truck 20C will receive two interrogatory signals transmitted from the antenna units 10C and 12C. In such a case, the two signals interfere with each other, possibly disabling the tag unit 22C for communication.

Figure 19:
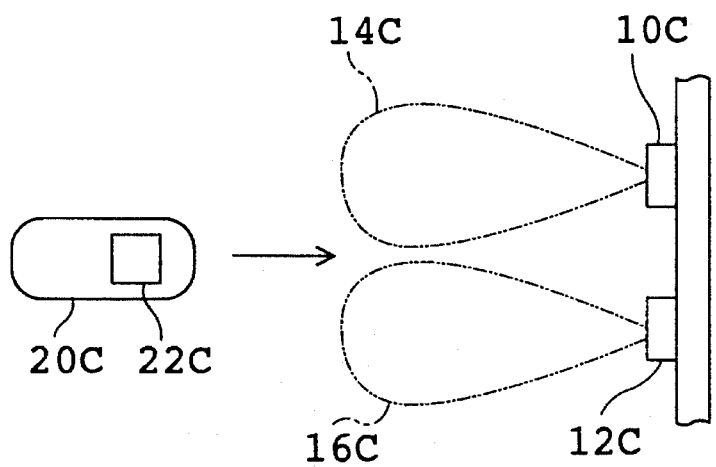
FIG. 19 is a schematic view explaining the disadvantage of another conventional device as opposed to the third invention.

To avoid this problem, the antenna units 10C and 12C may be arranged so that the communication areas 14C and 16C do not overlap, as shown in FIG. 19. However, this arrangement forms a dead zone for communication between communication areas 14C and 16C. If an unmanned truck 20C enters this dead zone, the tag unit 22C of the truck 20C will not be able to communicate through either of the antenna units 10C and 12C.

The invention disclosed in the Japanese Patent Provisional Publication No. 93390/1990 solves these problems by the following method. When a wide communication area is to be covered by a plurality of antenna units, the antenna units are allocated different communication periods. As a result, if the antenna units are arranged so that their communication areas overlap, tag units can communicate through the antenna units without wave interference.

However, when different communication periods are allocated to each of the several antenna units, that is, when the communication period is time-shared by the antenna units, each antenna unit can be used for communication only during the allocated period. If the system involves a large number of antenna units, the cycle of the communication period for each antenna unit will be long. For the tag unit of an unmanned truck to communicate properly while it is running in the communication area, a short communication period must be allocated to each antenna unit, or the unmanned truck must be driven at a limited speed.

The third invention has solved the above problems. An embodiment of the third invention will be described in detail below, with reference to FIGS. 11 through 17. In this embodiment, the third invention is applied to the identification system for unmanned trucks.

Figure 12:
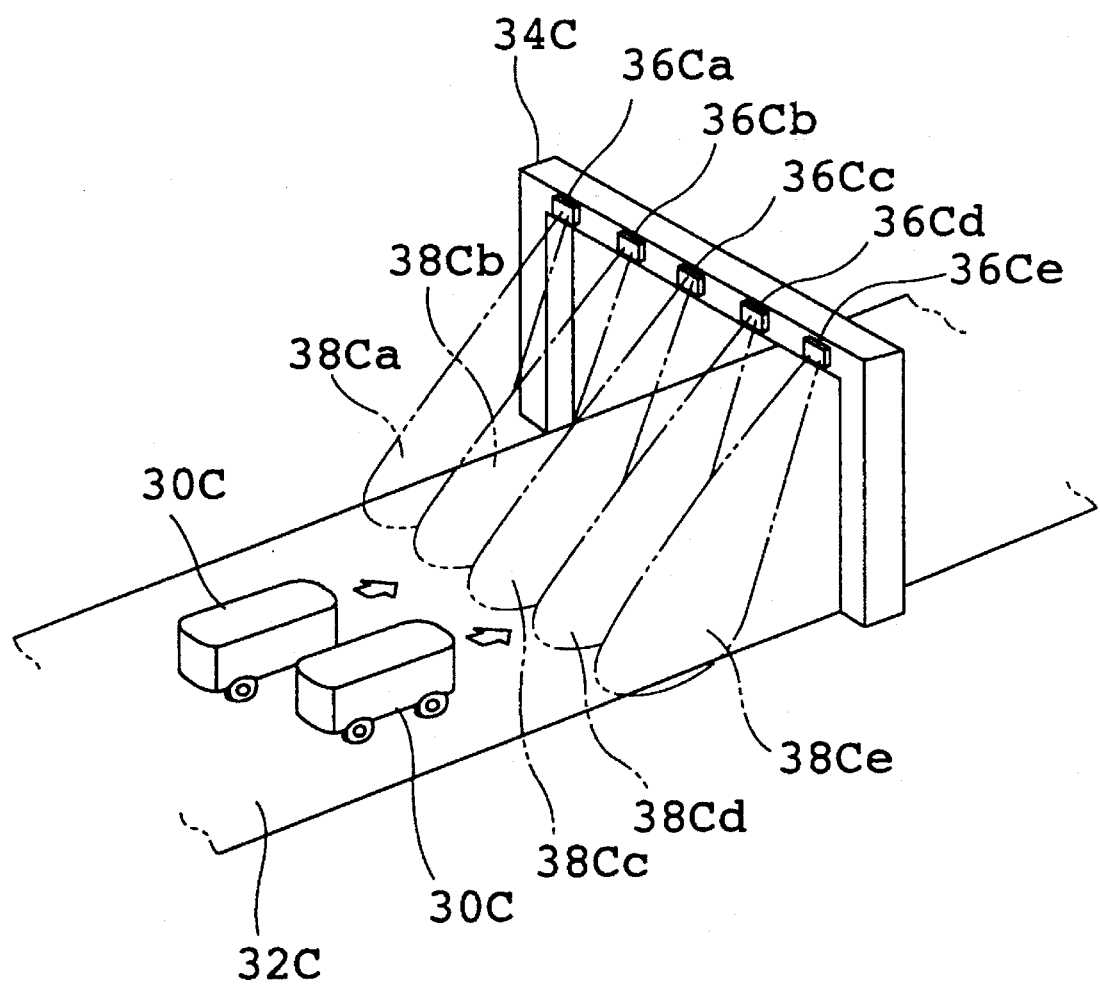
FIG. 12 is a perspective view showing the general appearance of the third invention.

In FIG. 12, showing the general appearance of the third invention, the motion of an unmanned truck 30C as a mobile object is controlled along a specified runway 32C. A gate 34C is located at the specified position of the runway 32C, to identify each unmanned truck 30C.

Figure 11:
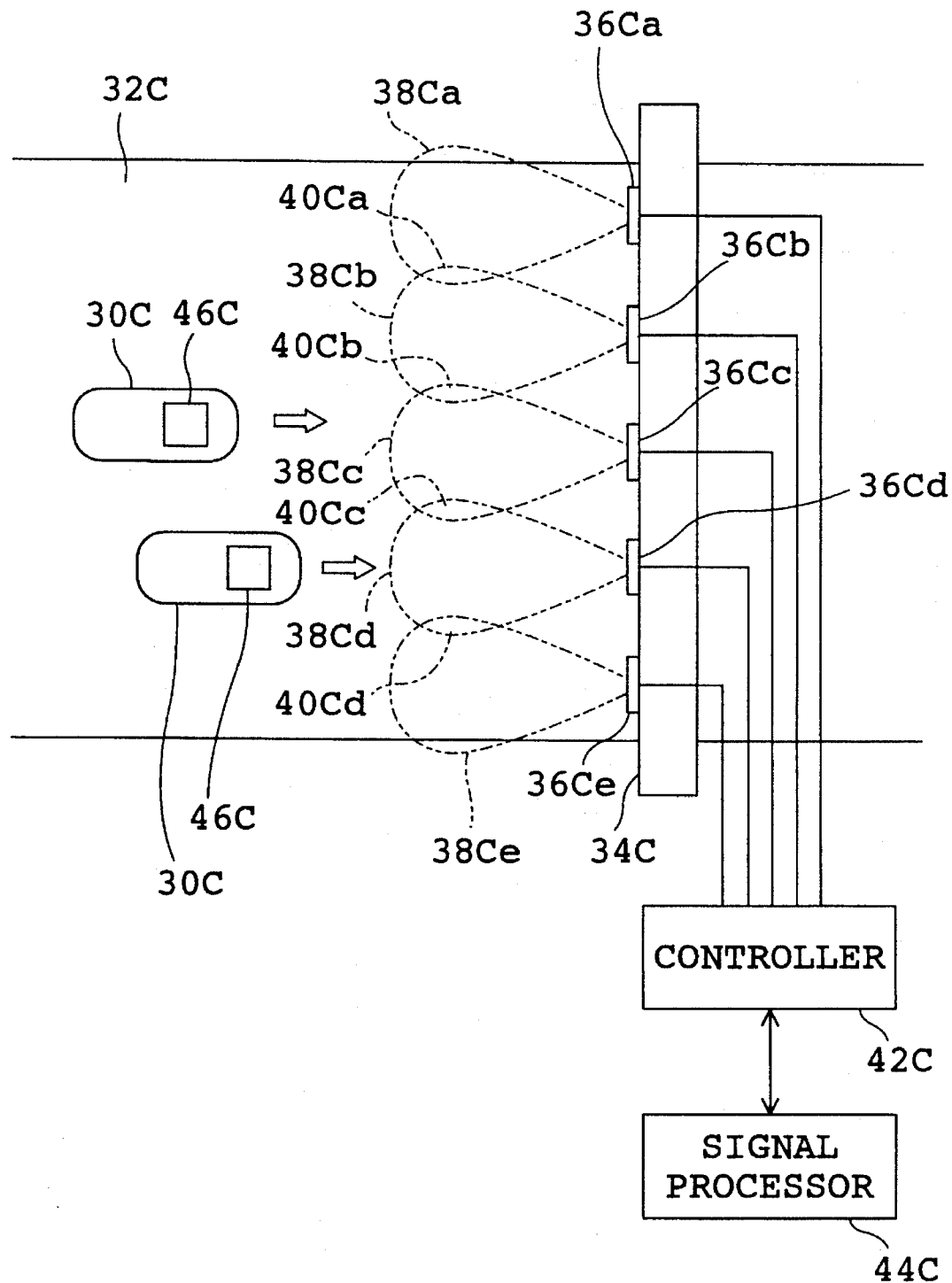
FIG. 11 is a schematic view explaining the general concept of the mobile object identification system according to the third invention.

The gate 34C is installed astride the runway 32C, and has a plurality of antenna units, e.g., five antenna units 36Ca through 36Ce, in portions above the runway 32C. The five antenna units 36Ca through 36Ce provide communication areas 38Ca through 38Ce, respectively, obliquely downward to the runway 32C. Of the communication areas 38Ca through 38Ce, the adjacent ones overlap each other as shown in FIG. 11, which explains the general concept of the third invention. The overlapping zones are denoted 40Ca, 40Cb, 40Cc and 40Cd, respectively.

Referring to FIG. 11, the antenna units 36Ca through 36Ce are connected to a controller 42C. The controller 42C not only controls data transmission/reception of the antenna units 36Ca through 36Ce but also sends communication data to and receives such data from a signal processor 44C, which may be a host computer. Each unmanned truck 30C has a tag unit 46C as a responding unit storing various data. When an unmanned truck 30C passes through the gate 34C, this tag unit 46C communicates with one of the antenna units 36Ca through 36Ce, as will be described later.

Figure 13:
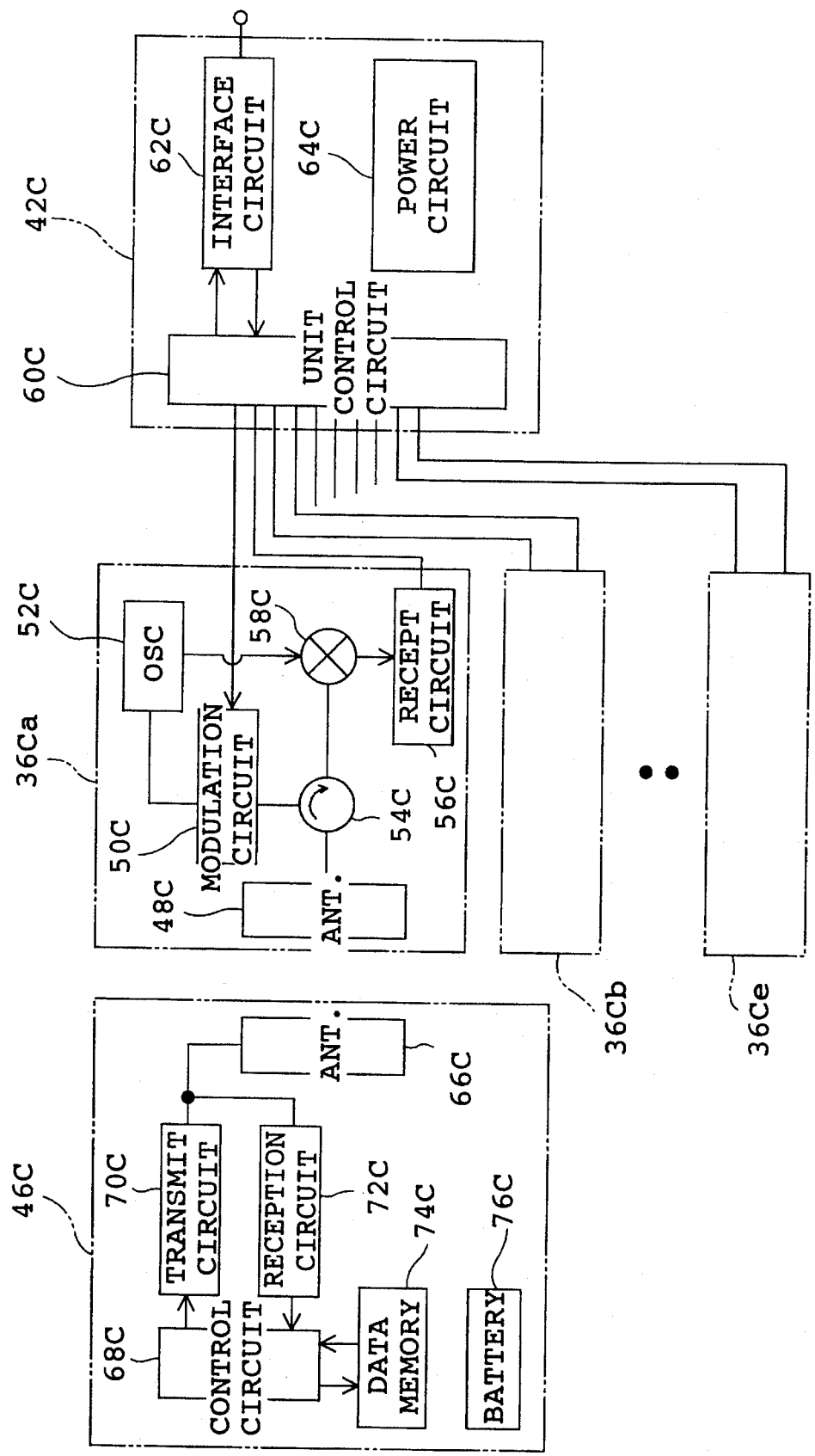
FIG. 13 is a block diagram showing the electrical construction of the third invention.

FIG. 13 shows the electrical construction of the invention. The construction of the antenna unit 36Ca is described. The antenna unit 36Ca comprises an antenna 48C for transmitting/receiving signals, a modulation circuit 50C, an oscillator 52C, a circulator 54C, a mixer 58C, and a reception circuit 56C.

The antenna 48C is composed of batch antennas realized by microstrip lines formed on PC boards; these batch antennas are arranged in multiples to form an array antenna for improving directivity and to accommodate long-distance communication.

The modulation circuit 50C modulates carrier wave with a frequency of f1 (generated by the oscillator 52C) by an interrogatory signal from the controller 42C, and outputs the modulated signal to the antenna 48C through the circulator 54C. A specified frequency band of, e.g., 2.45 GHz is allocated for the system of this invention so that semi-microwaves in this frequency band are output as carrier waves. The oscillator 52C outputs semi-microwaves at a frequency of f1 in this frequency band. The antenna 48C is adapted to selectively receive only radio waves with a limited frequency of f1 set by the oscillator 52C.

The reception circuit 56, which carries out signal processing such as demodulation, is connected to the mixer 58C. The mixer 58C receives not only carrier waves from the oscillator 52C but also radio waves as opposed to a responding signal from the antenna 48C through the circulator 54C. The carrier and radio waves as opposed to a responding signal are synthesized by the mixer 58C and input to the reception circuit 56C where the synthesized signal is demodulated to obtain a responding signal. The demodulated responding signal is output to the controller 42C.

The antenna units 36Cb through 36Ce are the same in construction as the antenna unit 36Ca, except that the oscillation frequency of the oscillator 52C is different in each antenna unit. Specifically, while the oscillation frequency of the oscillator 52C for the antenna unit 36Ca is set at f1, the oscillators 52C for the antenna units 36Cb through 36Ce are allocated narrow frequency bands which do not overlap, as denoted by f2 through f5 in FIG. 14. All these frequencies f1 through f5 are within the specified frequency band mentioned earlier, and are allocated to the antenna units 36Ca through 36Ce so that the oscillation frequency for an antenna unit is as different as possible from those for the adjacent antenna units, as shown in FIG. 14.

In the controller 42C, a unit control circuit 60C is connected to the modulation circuit 50C and reception circuit 56C of each of the antenna units 36Ca through 36Ce, to output interrogatory signals at a specified timing mentioned later, and to receive responding signals. The unit control circuit 60C is connected to the signal processor 44C through an interface circuit 62C. A power circuit 64C is fed with power from an AC power supply (not shown). When power is supplied, the power circuit 64C converts it to a specified DC voltage, and applies the DC voltage to the unit control circuit 60C and the interface circuit 62C, as well as to the antenna units 36Ca through 36Ce.

In the tag unit 46C as a responding unit, an antenna 66C, composed of a microstrip antenna formed on a PC board, is capable of receiving a wide frequency range of radio waves as indicated by the broken line in FIG. 14. Specifically, it is adapted to receive all interrogatory signals with frequencies f1 through f5 output from the antenna units 36Ca through 36Ce.

A control circuit 68C includes a CPU, ROM, RAM etc. It is designed to receive interrogatory signals, and to output various data, including the identification code, in the form of responding signals to the interrogatory signals, according to the stored program. The control circuit 68C is connected in two ways to the antenna 66C: through a transmission circuit 70C, and through a reception circuit 72C.

The transmission circuit 70C modulates the unmodulated carrier wave received through the antenna 66C, by a responding signal output from the control circuit 68C, and transmits the modulated wave. The reception circuit 72C demodulates the radio wave received through the antenna 66C, and inputs it as an interrogatory signal to the control circuit 68C. The control circuit 68C is connected to writable/readable nonvolatile memory data memory 74C. Each circuit in the tag unit 46C is fed with power by a battery 76C.

The operation of the third invention is described below with reference to FIGS. 15A to 15E, 16 and 17. The unit control circuit 60C of the controller 42C outputs interrogatory signals to the antenna units 36Ca through 36Ce at the timings shown in FIG. 15. Specifically, it outputs interrogatory signals to the antenna units 36Ca, 36Cc and 36Ce at the same timing with intervals of T1 as shown in FIG. 15A, FIG. 15C and FIG. 15E, and to the antenna units 36Cb and 36Cd at the same timing with intervals of T1 but later by T2 than the timing for the former three antenna units as shown in FIGS. 15B and 15D.

In each of the antenna units 36Ca through 36Ce, the modulation circuit 50C modulates the carrier wave from the oscillator 52C by an interrogatory signal output from the controller 42C, and sends it in the form of a microwave signal through the antenna 48C to the appropriate communication area 38Ca through 38Ce.

In the interrogatory signal output interval T1, the period "ta" is set for outputting an interrogatory signal, and the remaining period "tb" for outputting a responding signal. For any two adjacent antenna units, e.g., 36Ca and 36Cb, the interrogatory signal output periods "ta" do not overlap.

The modulation circuit 50C of each antenna unit 36Ca through 36Ce does not carry out modulation in the period "tb" when interrogatory signals are not given from the controller 42C. During this period, the carrier wave from the oscillator 52C is output unmodulated to each of the communication areas 38Ca through 38Ce via the antenna 48C. In other words, each antenna unit 36Ca through 36Ce always outputs radio waves, but transmits an interrogatory signal only during the period "ta" which comes at intervals of T1.

With interrogatory signals being thus output to the communication areas 38Ca through 38Ce, when an unmanned truck 30C, approaching the gate 34C on the runway 32C, enters the communication area 38Ca, the tag unit 46C communicates by the following method. The tag unit 46C receives radio waves by the antenna 66C. The reception circuit 72C demodulates the radio waves to an interrogatory signal, and sends the signal to the control circuit 68C.

Determining that the interrogatory signal is from the antenna unit 36Ca, the control circuit 68C outputs a responding signal of the identification code to the transmission circuit 70C. At this time, the antenna 66C is receiving an unmodulated carrier wave from the antenna unit 36Ca, and is sending it to the transmission circuit 70C. The transmission circuit 70C modulates this carrier wave by the responding signal, and reflects the modulated carrier back for transmission.

The antenna unit 36Ca receives the responding signal radio wave through the antenna 48C, thereby identifying the tag unit 46C. More specifically, the radio wave received by the antenna 48C is input through the circulator 54C and the mixer 58C to the reception circuit 56C, where it is demodulated to the responding signal and sent to the controller 42C. The unit control circuit 60C of the controller 42C then inputs the identification code data of the communicating tag unit 46C through the interface circuit 62C to the signal processor 44C.

To continue communicating with the tag unit 46C, the controller 42C controls the antenna unit 36Ca to output an interrogatory signal during the next interrogatory signal output period. If the interrogatory signal includes a write command instructing the tag unit 46C to store certain data, the control circuit 68C of the tag unit 46C carries out the processing to write the data to the data memory 74C. If the interrogatory signal includes a read command instructing the tag unit 46C to read certain data, the control circuit 68C of the tag unit 46C carries out the processing to read the data from the data memory 74C, and output it for communication.

Figure 16:
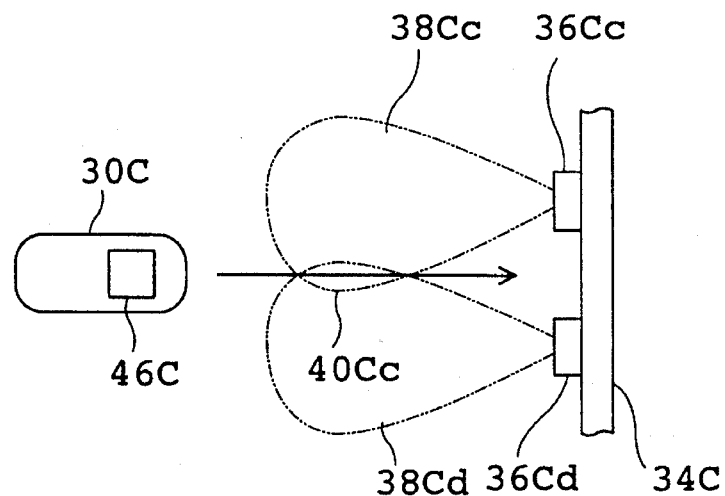
FIG. 16 is a schematic view explaining an operation of the third invention.
Figure 17:
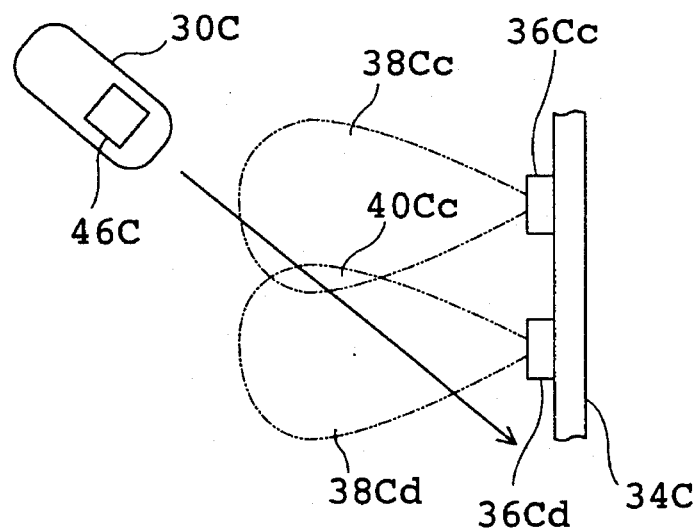
FIG. 17 is a schematic view explaining another operation of the third invention.

Now the operation of the present invention is described for the case in which the tag unit 46C of an unmanned truck 30C passes through the overlapping zone 40Cc, between the communication area 38Cc of the antenna unit 36Cc and the communication area 38Cd of the antenna unit 336Cd, as shown in FIG. 16. Since the interrogatory signal output timing of the antenna unit 36Cd lags by T2 behind that of the antenna unit 36Cc as described earlier, the tag unit 46C in the overlapping communication zone 40Cc receives the radio wave of an interrogatory signal from either the antenna unit 36Cc or 36Cd.

The tag unit 46C may receive the radio wave of an interrogatory signal from the antenna unit 36Cc first. The control circuit 68C of the tag unit 46C accepts the signal, and outputs a responding signal according to the process described above. The transmission circuit 70C modulates, by responding signal, the unmodulated carrier wave received from the antenna unit 36C*c* through the antenna 66C, and reflects it back for transmission. At the time of responding signal transmission, the antenna 66C may receive an interrogatory signal radio wave from the antenna unit 36C*d* because the tag unit 46C is positioned in the overlapping communication zone 40C*c*.

In such a case, the responding signal radio wave being transmitted from the antenna 66C to the antenna unit 36C*c* is also transmitted to the antenna unit 36C*d*, and the interrogatory signal from the antenna unit 36C*d* is modulated by a responding signal and transmitted to both antenna units 36C*c* and 36C*d*. However, since the frequencies of radio waves transmitted from the antenna units 36C*c* and 36C*d* are set differently at f3 and f4, respectively, the antenna unit 36C*c* can receive and identify the radio wave of responding-signal modulated carrier waves with a frequency of f3 alone. Furthermore, by including the identification code for each of the antenna units 36C*a* through 36C*e* in each interrogatory signal, and that for each tag unit 46C in each responding signal, each antenna or tag unit that receives a signal can determine whether the signal is intended for that antenna unit.

Thus, the tag unit 46C responds only to the interrogatory signal from the antenna unit 36C*c*—the signal received first —, communicating with the antenna unit 36C*c*. After completing communication with the antenna unit 36C*c*, if the tag unit 46C remains in the overlapping zone 40C*c*, it will accept the interrogatory signal from the antenna unit 36C*d* and communicate with it. Therefore, the tag unit 46C can communicate with the antenna units 36C*c* and 36C*d* accurately, without radio interference between the antenna units.

Furthermore, since the communication time is not divided between the antenna units 36C*c* and 36C*d* as it is for conventional time-sharing communication, each antenna unit is not limited in communication time. Consequently, even when the unmanned truck 30C is moving at high speed in the overlapping communication zone 40C*c*, the tag unit 46C has sufficient communication time to be identified by the antenna unit 36C*c* or 36C*d*.

In the overlapping communication zone 40C*c*, the tag unit 46C communicates with both antenna units 36C*c* and 36C*d*, and upon completing communication with either of the antenna units, it stops communicating with the other unit. Accordingly, when the unmanned truck 30C is moving on the runway 32C, passing through the communication area 38C*c*, the overlapping zone 40C*c* and the communication area 38C*d*, in the direction indicated by the arrow in FIG. 17, the tag unit 46C keeps communicating with both antenna units 36C*c* and 36C*d*, without interruption due to change in the communication area. By maintaining communication with both antenna units 36C*c* and 36C*d*, the tag unit 46C can always exchange signals with either of the antenna units 36C*c* and 36C*d* until it completes communication. When completing communication with either of the antenna units 36C*c* and 36C*d*, the tag unit 46C stops communicating with the other antenna unit 36C*c* or 36C*d*, as mentioned earlier, to prevent duplicate data writing; if duplicate data writing is not anticipated, it is not necessary to stop communicating with the other antenna unit.

Thus, according to the above embodiment of the third invention, while the five antenna units 36C*a* through 36C*e*, providing communication areas 38C*a* through 38C*e*, respectively, are set with the communication areas of the adjacent antenna units overlapping, the oscillators 52C of the five antenna units 36C*a* through 36C*e* are allocated with different narrow bands of oscillation frequencies f1 through f5, and the controller 42C controls the antenna units 36C*a* through 36C*e* so that adjacent antenna units provide overlapping communication zones 40C*a* through 40C*d* output interrogatory signals at different timings, with the time lag T2. As a result, each of the antenna units 36C*a* through 36C*e* can communicate accurately and promptly with the tag unit 46C of an unmanned truck 30C passing through the respective communication areas.

In the above embodiment, the antenna units 36C*a* through 36C*e* are positioned so that the communication areas of adjacent antenna units overlap. Alternatively, the antenna units 36C*a* through 36C*e* may be positioned so that the communication areas of three or more of the antenna units overlap. In such a case as well, communication can be accurate, without any radio interference, if the antenna units 36C*a* through 36C*e* are controlled to output interrogatory signals at different timings.

In the above embodiment, the third invention is applied to an unmanned truck identification system. The invention is applicable to other mobile object identification system as well, including factory process control system for control of products in the production line, and in systems for managing room entry/exit.

Before the fourth and fifth inventions are explained, the conventional arts as opposed to the fourth and fifth inventions and their problems will be detailed in the following.

Presently, a vehicle is identified from the exterior by the license plates attached to its front and rear (or to the rear alone for a two-wheeled vehicles), from the mandatory vehicle inspection label to be updated three years after purchase and thereafter every two years in general, and from the regular inspection and maintenance label indicating that the vehicle has undergone regular inspection and maintenance. These labels are often attached to the inside of the front windshield. All of the above information for identifying the vehicle is checked visually. When a vehicle is moving, it is difficult to check the above information visually, particularly at night.

A non-contact information card is conventionally known as means for radio communication. When this information card is used in a vehicle, the driver holds up the card to face it toward an interrogator or other information reader, or places it on the dashboard, to communicate with the interrogator. If this information card retains vehicle identification data such as the frame number stamped on the frame of each vehicle, the vehicle registration number shown on the license plate, and the expiration date of the mandatory inspection certificate, the information card could be used to provide the identifying information specific to each vehicle.

In such applications, however, since the information card is not fixed to the vehicle, it can be taken and used for other vehicles. Consequently, the information stored in the information card does not always conform to the identifying information specific to the vehicle for which the card is being used. Such information card is therefore not practical in view of its high potential for abuse.

Figure 20:
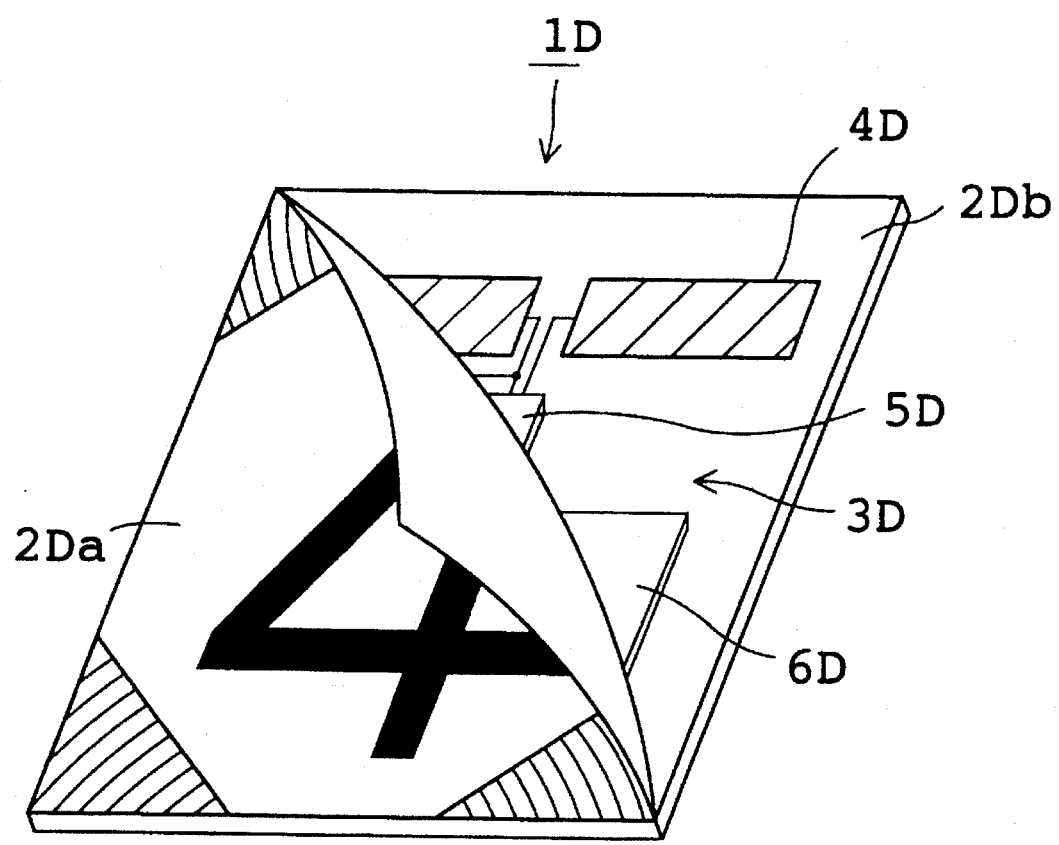
FIG. 20 is a general perspective view showing an embodiment of the electronic label according to the fourth invention.

The fourth invention has solved the above problem. An embodiment of the fourth invention is described below. FIG. 20 is a general view of the electronic mandatory inspection label 1D according to an embodiment of the fourth invention. The electronic mandatory inspection label 1D is roughly divided into a visible information layer 2D*a* and an electronic circuitry layer 2D*b*, which are joined with adhesive so as not to be easily separable. The visible information layer 2D*a* may be made of paper, with printed information, including a figure indicating the month of expiration of the mandatory inspection certificate. The electronic circuitry layer 2Db incorporates a responding circuit 3D which sends and receives electronic information.

Figure 21:
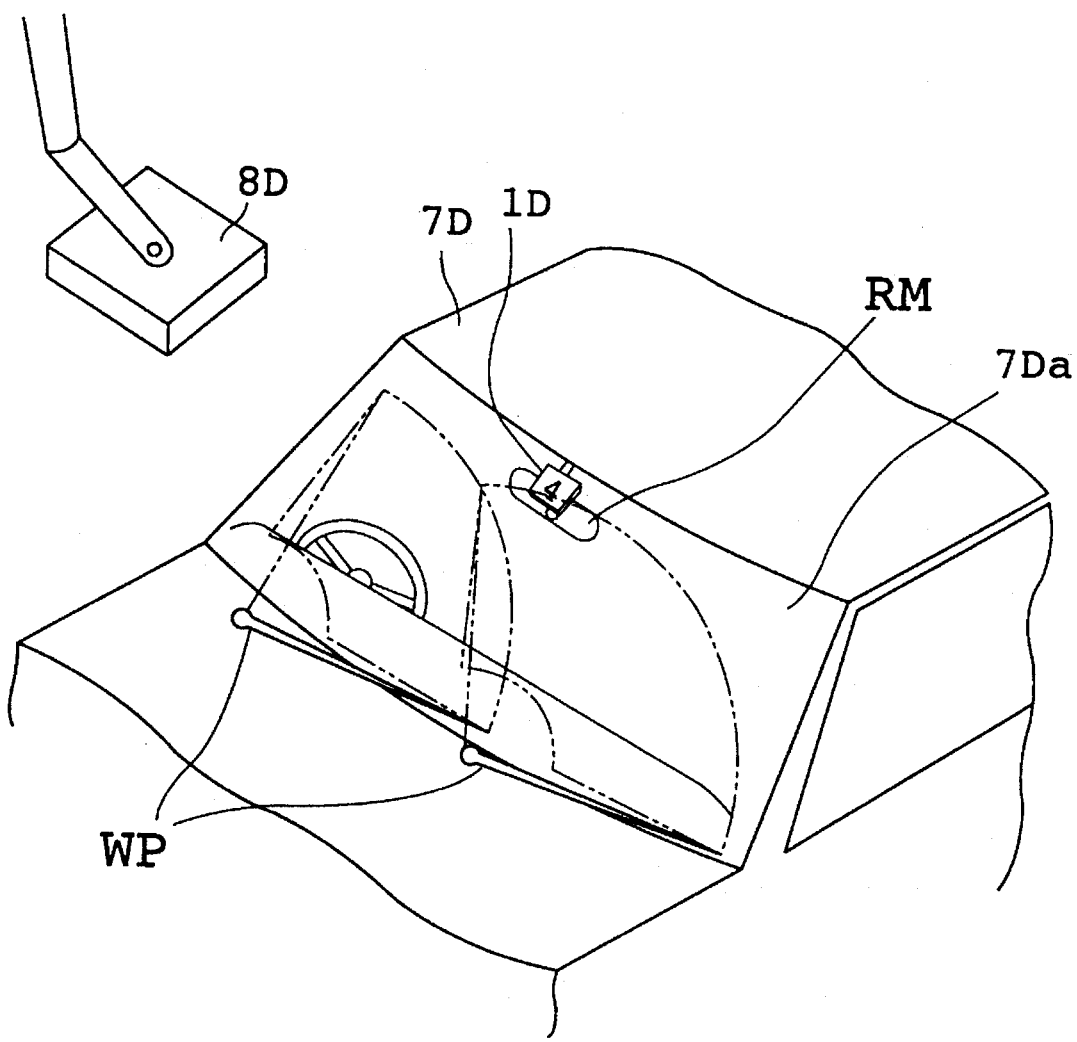
FIG. 21 is a perspective view showing an example of the actual application of the fourth invention.

The electronic mandatory inspection label 1D is fixed to the front windshield 7Da of a vehicle 7D, as shown in FIG. 21, using adhesive so that it cannot be removed, or using an appropriate change-preventive material that leaves clear evidence of removal. The electronic mandatory inspection label 1D communicates with interrogators 8D (described later) installed along a road.

The most preferable fixing position of the electronic mandatory inspection label 1D is, as shown in FIG. 21, the upper center of the front windshield 7Da, just behind the rearview mirror RM, as viewed from the driver's seat. In this position, the label does not obstruct the driver's view. In addition, this position is outside the moving range (indicated by the chain double-dashed lines in FIG. 21) of the windshield wiper arms WP, so that the metal used in the wiper arms has minimal influence on communication between the responding circuit 3D and an interrogator 8D.

Figure 22:
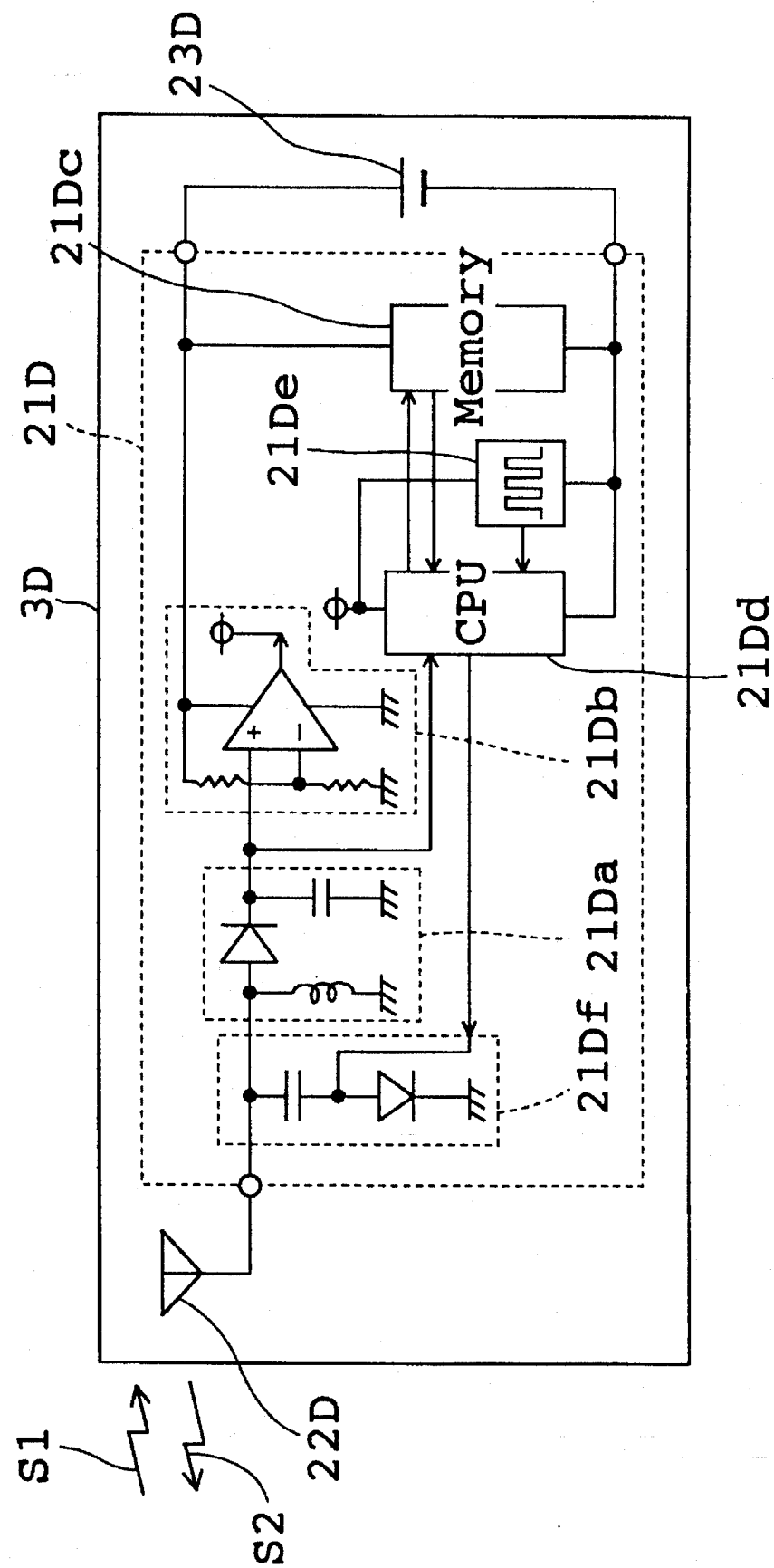
FIG. 22 is a diagram showing the electrical construction of the responding circuit of the fourth invention.

The construction of the responding circuit 3D is now described in detail, with reference to FIG. 22. The responding circuit 3D comprises an IC chip 21D for processing internal information, an antenna 22D for receiving interrogatory signals S1 and transmitting responding signals S2, and a built-in battery 23D for driving the IC chip 21D.

The IC chip 21D comprises a detector 21Da, a level comparator 21Db, a memory 21Dc, a central processing unit (hereinafter referred to as the CPU) 21Dd, a clock generator 21De, and a modulator 21Df. The detector 21Da detects information in an interrogatory signal S1 received by the antenna 22D. The level comparator 21Db confirms reception of the interrogatory signal based on the signal level data sent from the detector 21Da, and supplies power to each circuit. The memory 21Dc stores vehicle information such as a frame number, data on the mandatory inspection certificate expiration, and a vehicle registration number (license plate number). When the CPU 21Dd receives power from the level comparator 21Db, it transmits a signal according to the information stored in the memory 21Dc. The clock generator 21De generates clock pulses to operate the CPU 21Dd. The modulator 21Df modulates the interrogatory signal S1 using the signal output from the CPU 21Dd, and transmits it as a responding signal S2 through the antenna 22D.

An interrogatory signal S1 sent from an interrogator 8D is received by the responding circuit 3D through the antenna 22D. Receiving this signal, the level comparator 21Db starts to supply power to the CPU 21Dd and to the clock generator 21De. Then, the CPU 21Dd interprets and executes the command contained in the interrogatory signal S1. If the command demands internally stored data, the CPU 21Dd operates to modulate the interrogatory signal S1 by the information stored in the memory 21Dc and to transmit it as an internal-information-bearing responding signal S2 through the antenna 22D.

Now, the following paragraphs describe an interrogator 8D which outputs radio waves to the responding circuit 3D to obtain vehicle information.

Figure 23:
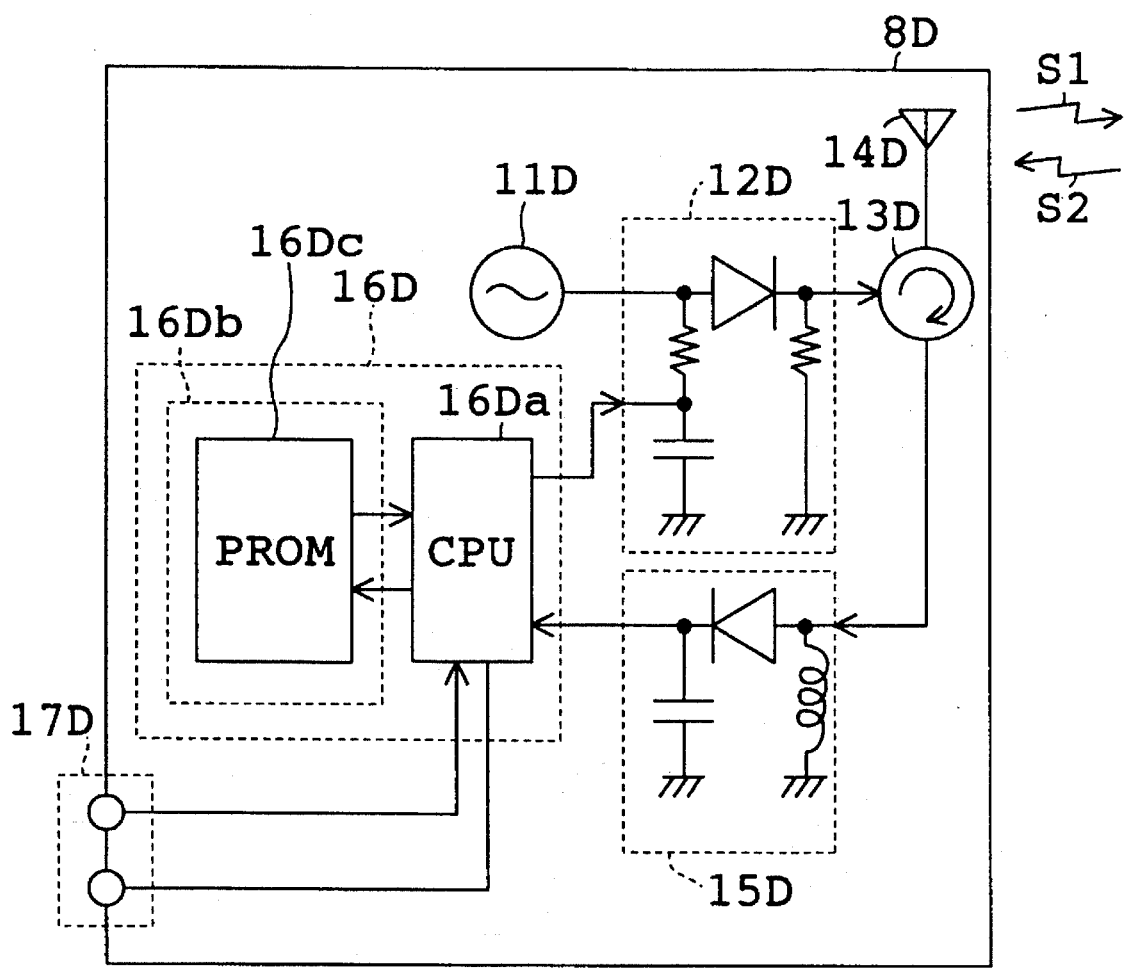
FIG. 23 is an electric circuit diagram of the interrogator for the fourth invention.

The means of the interrogator 8D is to transmit interrogatory signals S1 to, and receive responding signals S2 from, the above-mentioned electronic mandatory inspection label 1D. As shown in FIG. 23, the interrogator 8D comprises: a carrier generation circuit 11D to generate a carrier wave; a modulator 12D to produce an interrogatory signal S1 by superposing information on the carrier wave; a circulator 13D to separate transmission waves from received waves; an antenna 14D as the entrance and exit of electromagnetic waves; a demodulator 15D to detect information in the received waves of a responding signal S2; a signal processor 16D to control the modulator 12D and demodulator 15D to process information; and an external interface 17D which communicates necessary information of the received responding signal S2 to an upper information processing system (such as the system management computer 30D shown in FIG. 25).

The signal processor 16D is composed of a CPU 16Da which includes programs to control communication, and a system-identifying information setting block 16Db which sets the identification number for the system. This block 16Db is composed of a PROM 16Dc to store system-identifying information.

Having the circuitry construction mentioned above, the interrogator 8D operates as follows.

An interrogatory signal S1 to be transmitted from the interrogator 8D is produced in the modulator 12D by modulating the carrier wave from the carrier wave generation circuit 11D. In other words, the data sent from the signal processor 16D to the modulator 12D is superposed on the interrogatory signal S1. The interrogatory signal S1 thus produced is sent through the circulator 13D, and is radiated into the air through the antenna 14D.

When a responding signal S2 is returned from the responding circuit 3D of the electronic mandatory inspection label 1D, the interrogator 8D receives it by the antenna 14D. The responding signal S2 is then input through the circulator 13D to the demodulator 15D, which extracts information from the responding signal S2 and gives the information to the signal processor 16D. The signal processor 16D processes the information, and outputs it, if necessary, to the external interface 17D. The signal processor 16D also carries out internal processing based on the control instruction and various other information input from the external interface 17D, and sends transmission data to the modulator 12D.

Figure 24:
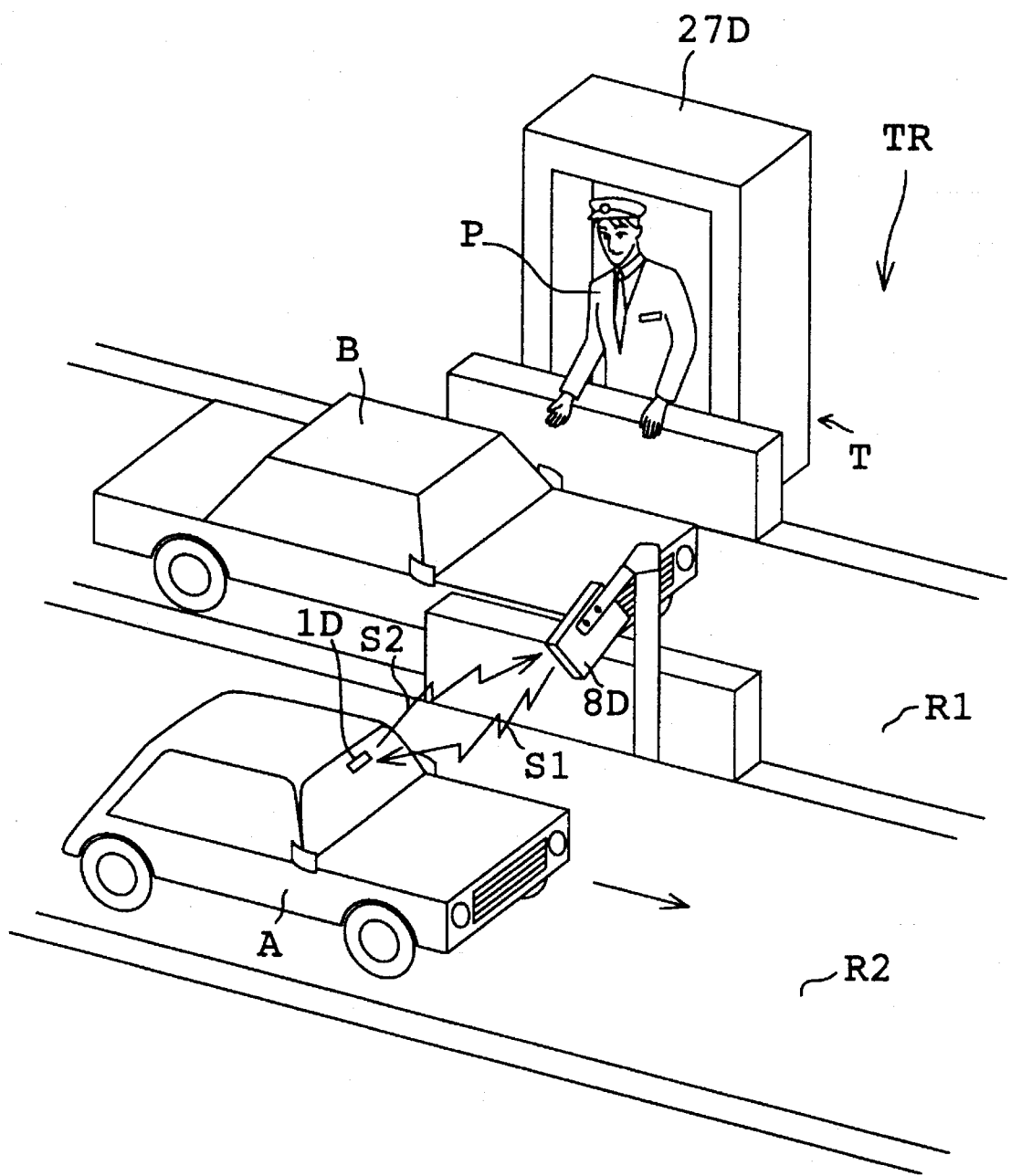
FIG. 24 is a schematic view explaining an example of the actual application of the fourth invention to a toll road accounting system.

Using the above-mentioned electronic mandatory inspection label 1D and interrogator 8D, it is possible to realize the systems given below:

(1) Toll road accounting system (FIG. 24)

When an ordinary vehicle B approaches a toll gate T on a toll road TR, the vehicle B is required to run along the first lane R1 and stop in front of the toll booth 27D to pay the toll to a collecting person P.

Meanwhile, when a vehicle A bearing the electronic mandatory inspection label 1D approaches the toll gate T, it has only to run along the second lane R2 to pay the toll; the interrogator 8D installed above the second lane R2 reads the frame number and other vehicle information from the electronic mandatory inspection label 1D of the vehicle A, and judges the vehicle A admissible to the road, based on the information registered in the system management computer (not shown). In this case, the toll may be paid from the designated bank account on a later day. If read information is stored in a database, it is possible to obtain monthly data on how many times each vehicle has passed the toll gate T, thus enabling the system to give toll discounts to vehicles frequently using the toll road.

Figure 25:
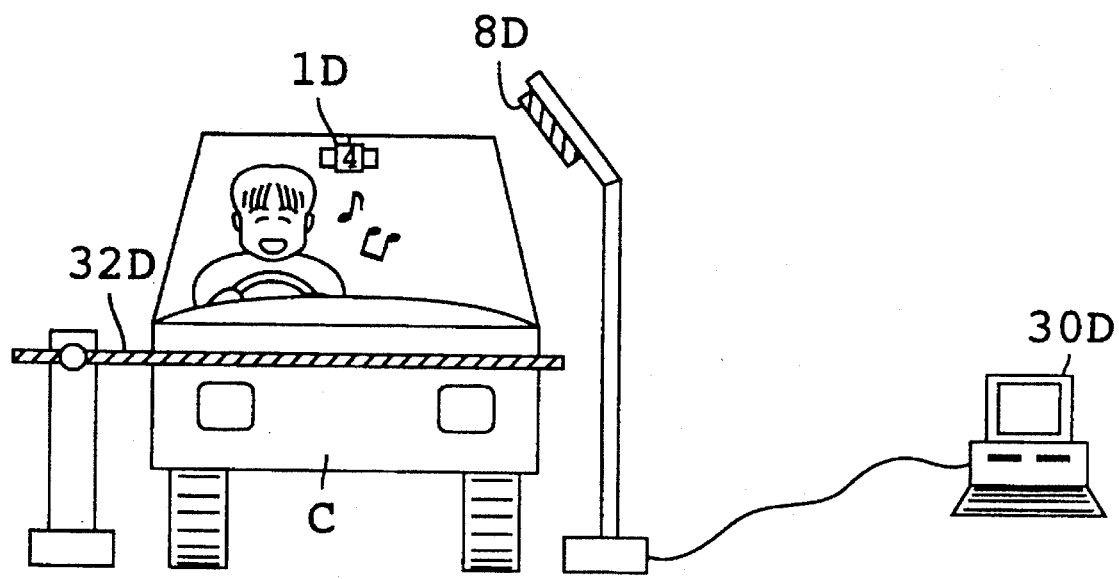
FIG. 25 is a schematic view explaining an example of actual application of the fourth invention to an incoming/outgoing vehicle management system of a parking lot.

(2) Incoming/outgoing vehicle management system of a parking lot (FIG. 25)

When a vehicle C bearing the electronic mandatory inspection label 1D enters a parking lot, the interrogator 8D installed at the upper part of the entrance reads the frame number and other vehicle information of the vehicle C from the electronic mandatory inspection label 1D. The vehicle information read by the interrogator 8D is input to the system management computer 30D connected with the interrogator 8D. If the frame number of the vehicle C has been registered as a customer of the parking lot, the computer 30D judges the vehicle C as a customer, based on the input information, and opens the barrier gate 32D.

The vehicle C is thus allowed to enter the parking lot without paying the parking charge at the entrance. The charge may be paid from the designated bank account on a later day as in the case of the toll road accounting system. If read information is stored in a database, it is possible to obtain monthly data on how many times each vehicle has used the parking lot, thus enabling the system to give discounts on parking charges to vehicles frequently using the parking lot.

Figure 26:
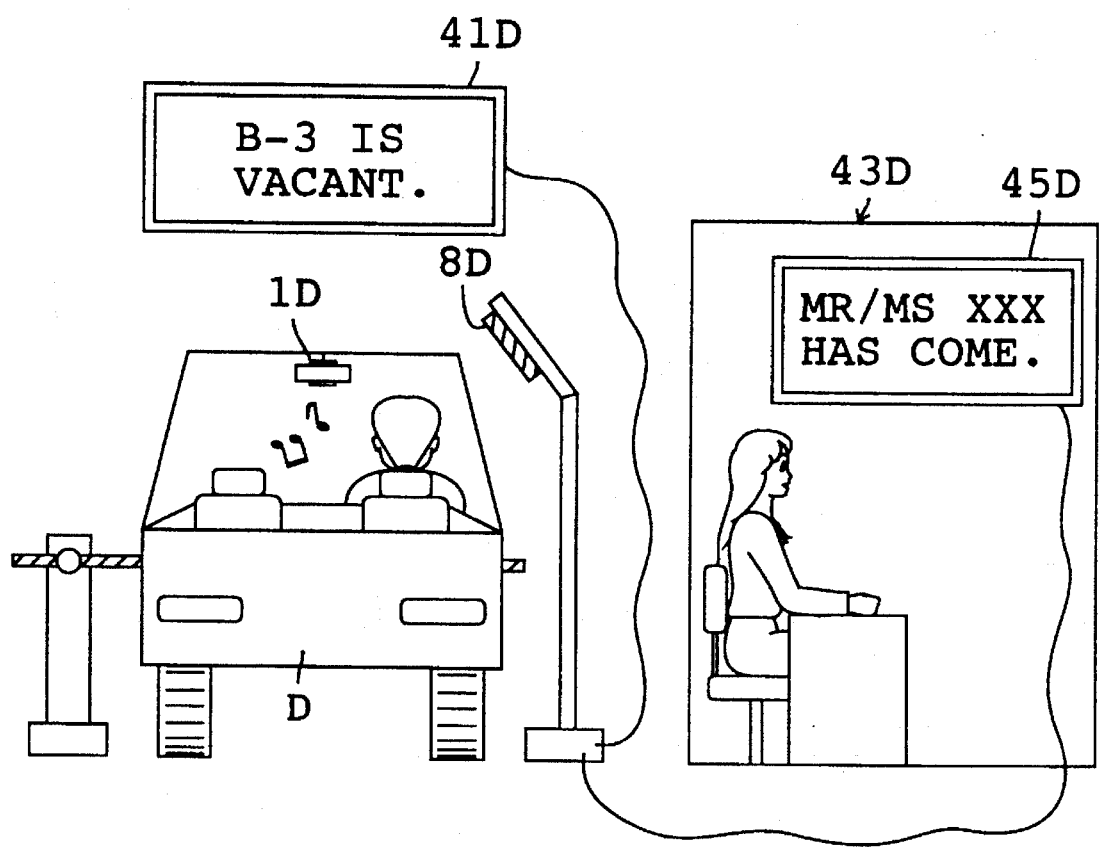
FIG. 26 is a schematic view explaining an example of the actual application of the fourth invention to a regular customer sensing system.

(3) Regular customer sensing system (FIG. 26)

When a vehicle D bearing the electronic mandatory inspection label 1D is to enter the parking lot of a department store, the interrogator 8D installed at the entrance reads the vehicle information from the label 1D. If the vehicle information indicates that the visitor is a special regular customer, the system may show a vacant parking space number on the guideboard 41D, and inform the special customers section of the visit of the special regular customer by displaying such on the indication board 45D, thus enabling a person in charge to meet the customer promptly.

(4) Illegal parking control by the police

In controlling illegal parking, the police can collect vehicle information (frame numbers, license plate numbers etc.) using a portable handy terminal that incorporates the interrogator 8D. This tool eliminates the need to fill out documents with pens, allowing each policeman to control a large number of illegally parking vehicles efficiently in a short period of time.

Figure 27:
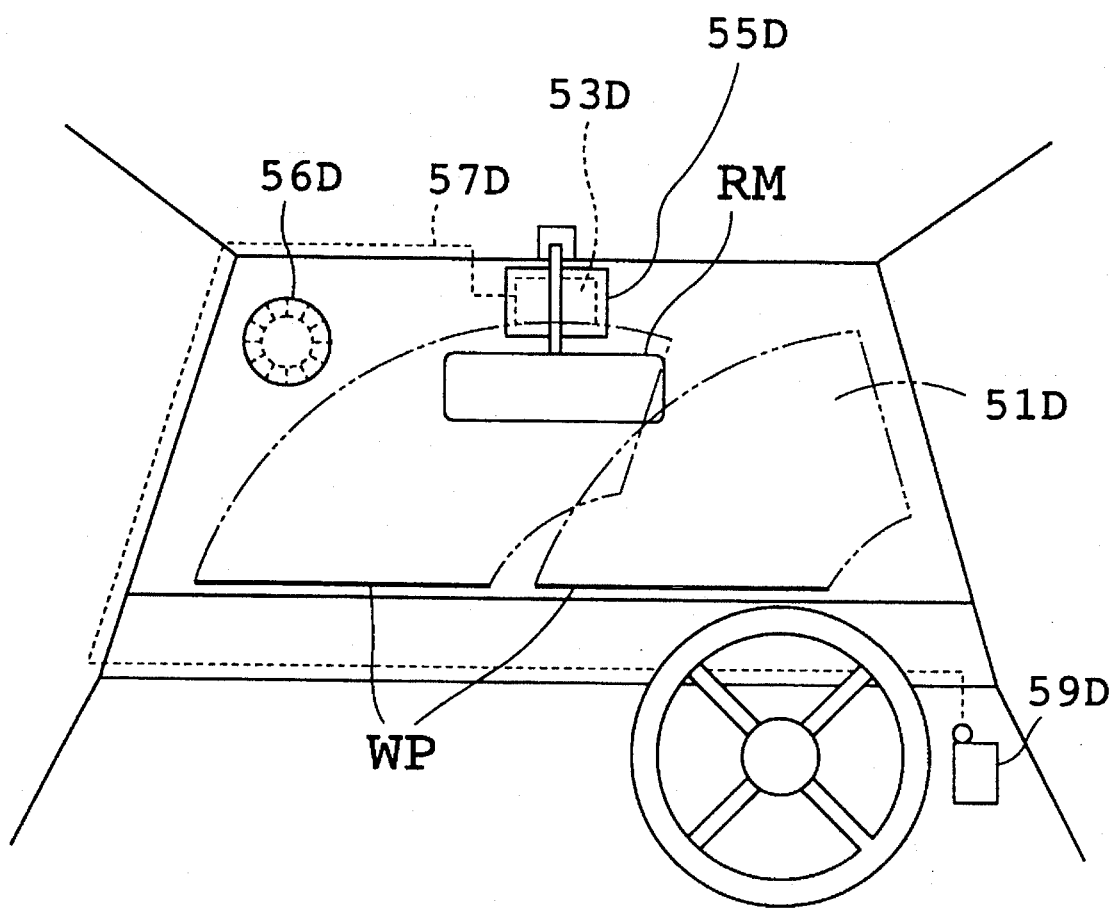
FIG. 27 is a general view of the windshield glass of a vehicle incorporating the responding circuit of the electronic label of the fifth invention, as viewed from inside the vehicle.

(5) Control by the police of vehicle mandatory inspection certificate expiration By installing the interrogator 8D above or on the side of roads, the police can control vehicles whose mandatory inspection certificates have expired. With radio waves transmitted to each oncoming vehicle, the interrogator 8D reads at least the frame number and the expiration date of the mandatory inspection certificate from the electronic mandatory inspection label 1D attached to the vehicle. Based on the information thus read, the police can find illegal vehicles. Conventionally, to find such illegal vehicles, policemen have been required to visually read the month of expiration on each mandatory vehicle inspection label 55D (FIG. 27). The present application of the fourth invention relieves policemen from such troublesome and inefficient work, and is very effective because it enables the police to obtain vehicle information easily, even from a moving vehicle.

(6) Criminal investigation by the police

In criminal investigation, the police may be required to detect an escaping vehicle. The electronic mandatory inspection label 1D can be applied to this purpose. In such application, the interrogators 8D are installed at important points of cities, so that information on the escaping vehicle can be obtained and referred to for pursuit. Conventionally, investigators have been required to identify visually the characteristic and license plate number of the escaping vehicle. The present invention eliminates the need for such visual identification, and is very effective because it enables the police to identify the vehicle in question easily, even if the vehicle is moving.

The electronic label for a vehicle according to the fifth invention is described in the following.

FIG. 27 is a general view of the front windshield 51D, as viewed from inside the vehicle, which incorporates the responding circuit 53D of the electronic label for a vehicle according an embodiment of the fifth invention. The responding circuit 53D is integral with a power line 57D, and is embedded in the front windshield 51D. The power line 57D is passed through the front windshield 51D, and connected to an on-board battery 59D.

The responding circuit 53D is embedded in the front windshield 51D at a position, for example, behind the rearview mirror RM, where the mandatory vehicle inspection label 55D is attached. Concealed by the mirror RM and the mandatory vehicle inspection label 55D, the responding circuit 53D is not visible from the driver's seat. Preferably, the responding circuit 53D is located in the upper center of the front windshield 51D and outside the moving range (indicated by the chain double-dashed lines in FIG. 27) of the windshield wiper arms WP, for the same reason as mentioned for the electronic mandatory inspection label 1D of the fourth invention.

More preferably, the mandatory vehicle inspection label 55D should be attached to the front windshield 51D in such a position that the upper end portion of the label 55D is laid over the responding circuit 53D, so that the necessary information, including the figure indicating the expiring month on the label 55D is visible, and that the responding circuit 53D is hidden behind the label 55D.

Figure 28:
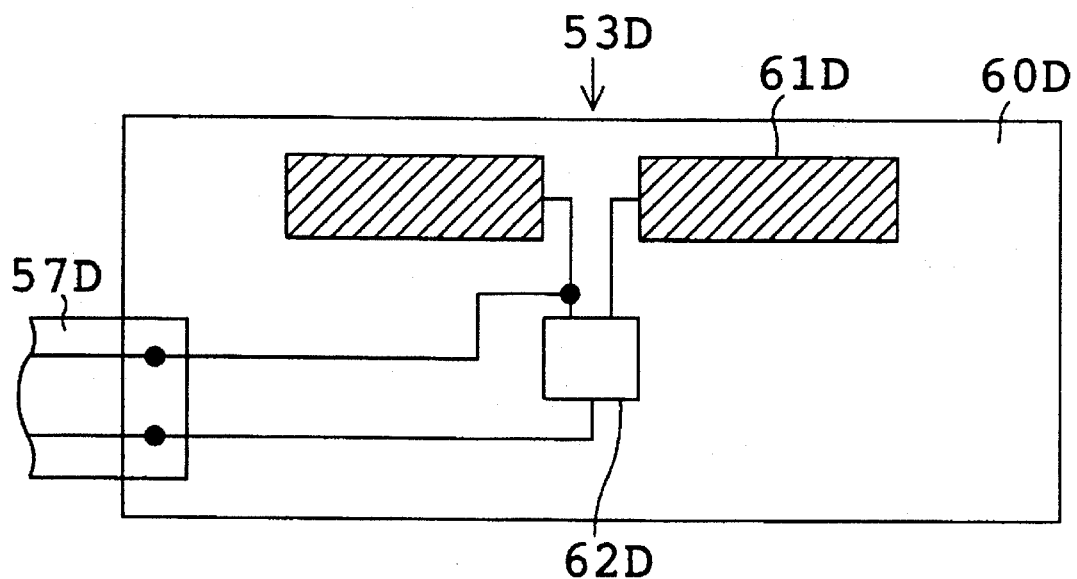
FIG. 28 is a schematic view showing the general construction of the responding circuit of the fifth invention.

The responding circuit 53D of the fifth invention is of the same construction as the responding circuit 3D of the electronic mandatory inspection label 1D, except that the former circuit 53D does not have a built-in battery 23D. Specifically, as shown in FIG. 28, it comprises an antenna unit 61D for transmitting and receiving radio waves, an IC chip 62D for processing internal information, and a power line 57D for supplying power to drive the IC chip 62D, all arranged on a transparent PET substrate 60D.

Figure 29:
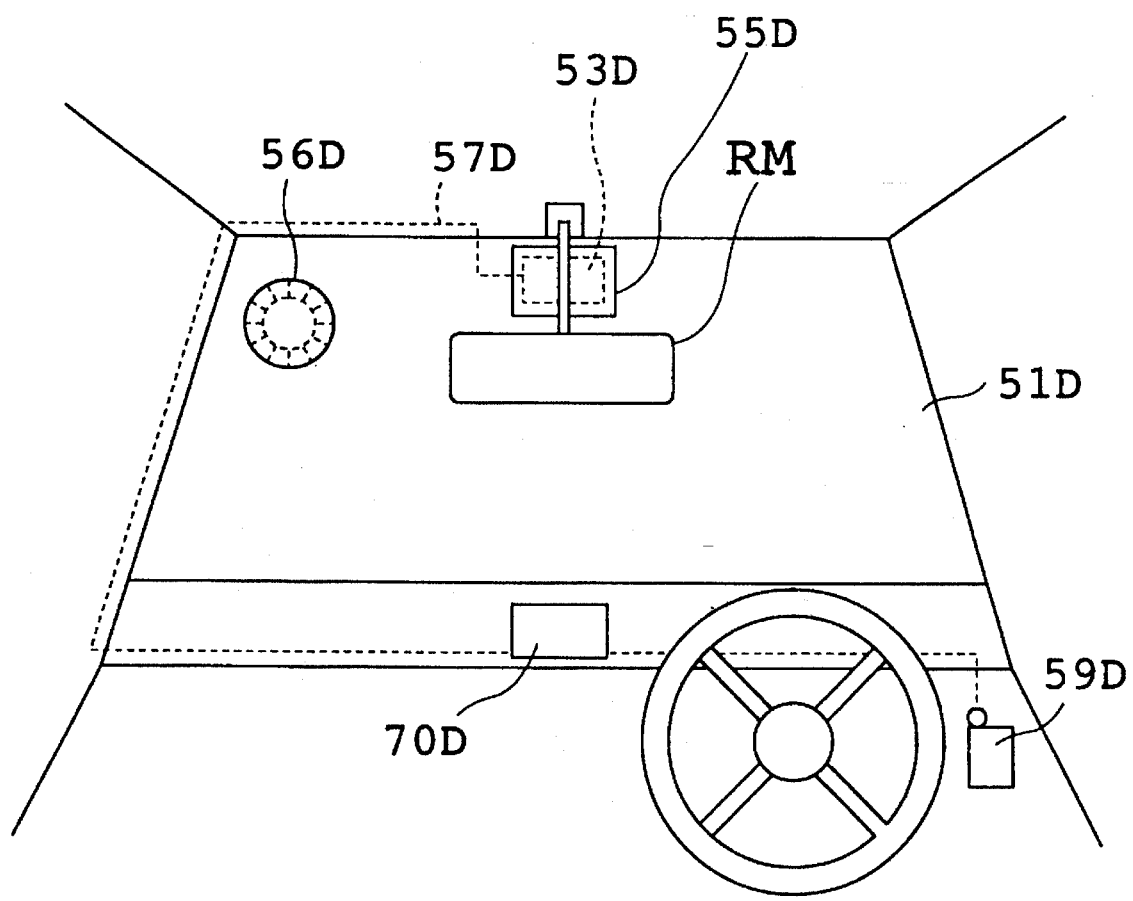
FIG. 29 is a general view of the windshield glass of a vehicle incorporating the responding circuit of the fifth invention connected to another information processor, as viewed from inside the vehicle.

FIG. 29 shows another general view of the front windshield 51D, as viewed from the inside of a vehicle, in which the responding circuit 53D is connected to another information processor 70D, which may be an IC card reader/writer. In this case, as shown, the responding circuit 53D is integrally connected with a communication/power line 57D, and is embedded in the front windshield 51D. The communication/power line 77D is passed through the front windshield 51D and connected to the information processor 70D, which is connected to the on-board battery 59D. An IC card, a floppy disc, a reloadable optical disc (compact disc), or any other reloadable tool may be used as information processing media for the information processor 70D.

Some methods of embedding the responding circuit 53D in the front windshield 51D will be described with reference to FIGS. 30A to 30C. FIGS. 30A and 30B show a method applicable when the front windshield is of laminated glass. In the process of manufacturing the laminated glass, the responding circuit 53D is sandwiched together with a resin sheet 51Db between a top glass sheet 51Da and a bottom glass sheet 51Dc. FIG. 30C shows another method. A recess is formed inside the front windshield 51D, and the power line 57D or communication/power line 77D is passed through the glass to a position under the recess. Then, the responding circuit 53D is set in the recess so that the electrodes of the circuit 53D come in contact with the power line 57D or communication/power line 77D. A glass cover 51Dd is placed over the responding circuit 53D, and fixed to the front windshield 51D using adhesive 51De. By either of the above methods, it is possible to integrally incorporate the responding circuit 53D into the front windshield 51D (or in other words, into a vehicle body).

If the responding circuit 53D of the fifth invention incorporated into the front windshield 51D is mounted on a vehicle, it is also very effectively applicable to the toll road accounting system, the incoming/outgoing vehicles management system of a parking lot, the regular customer sensing system, the control by police of illegal parking or expiration of the vehicle mandatory inspection certificate, criminal investigation by the police etc., as is the electronic mandatory inspection label 1D of the fourth invention.

The operation of the fifth invention in application as a toll accounting system of FIG. 24 is described in the following. If the responding circuit 53D is connected to an IC card reader/writer as the information processor 70D, as shown in FIG. 29, and if the IC card has a prepaid means, the information that the vehicle A has been judged admissible to the toll road is sent through the communication/power line 77D to the IC card reader. The IC card then deducts one point from the number of prepaid points, thereby paying the toll. If the IC card has a credit means, after vehicle A has been judged admissible, the credit number is output from the IC card to the responding circuit 53D. The responding circuit 53D communicates the credit number to the interrogator 8D, to pay the toll on credit.

In the application to the incoming/outgoing vehicle management system of a parking of FIG. 25 as well, if the responding circuit 53D is connected with the IC card reader/writer to enable the interrogator 8D to read the credit number, the driver can pay the parking charge on credit.

In the embodiment described above, the responding circuit 53D is located in the position where the vehicle mandatory inspection label 55D is attached, as shown in FIG. 27. The responding circuit 53D may be positioned in the upper left corner of the front windshield 51D, where the regular check and maintenance label 56D is attached as shown in FIG. 27. In this position as well, the responding circuit 53D is outside the moving range (indicated by the chain double-dashed lines in FIG. 27) of the windshield wiper arms WP.

In the present embodiment of the fifth invention, the responding circuit 53D is embedded in the front windshield, for convenience in communicating with an interrogator 8D and on the assumption that vehicles normally move forward. The responding circuit 53D can be embedded in the rear windshield or a window glass without affecting the spirit of the invention. However, considering that the invention is applied to various police control systems, as mentioned above, the responding circuit 53D should not be built into movable window glass for the following reason: if the window glass containing the responding circuit 53D has been moved into the side panel to open the window, the metal of the side panel hampers communication between the responding circuit 53D and the interrogator 8D.

According to the present embodiment of the fifth invention, transparent PET is used for the substrate of the responding circuit 53D, as shown in FIG. 28. Other material, such as resin and glass, may be used instead of PET as long as it is transparent.

Figure 31:
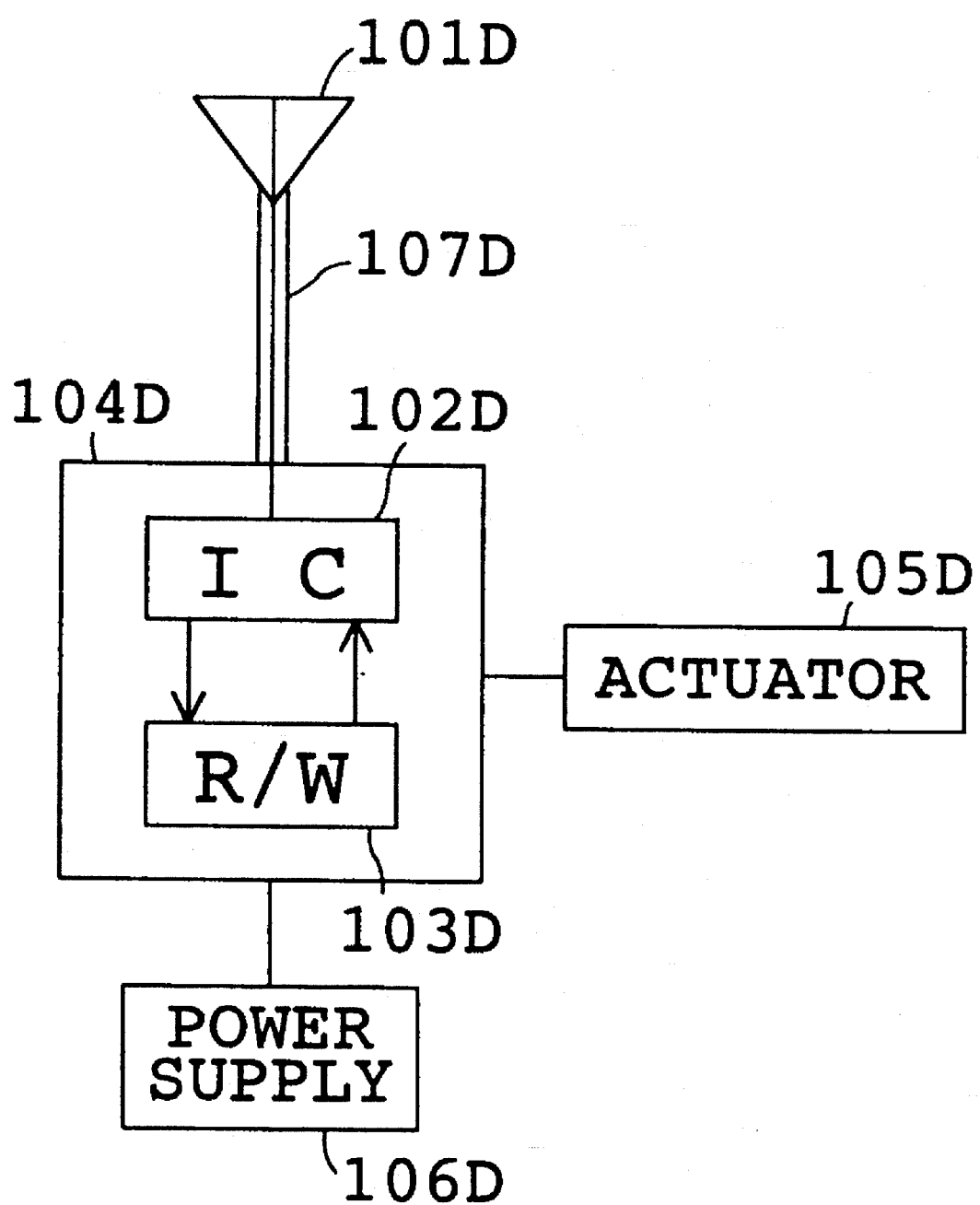
FIG. 31 is a diagram showing the general electrical construction of another embodiment of the fifth invention, concerning the window glass that incorporates the responding circuit.

Now, a second embodiment of the fifth invention concerning the responding-circuit-incorporating windshield 51D is described in the following. FIG. 31 shows the electrical construction of the second embodiment. As shown, the second embodiment comprises an antenna 101D, an information processor 104D, a shield wire 107D connecting the antenna 101D with the information processor 104D, a power supply 106D, and an actuator 105D. The information processor 104D is composed of an RF processing IC 102D and a reader/writer (hereinafter referred to as R/W) 103D which exchanges data with the RF processing IC 102D.

The R/W 103D may be an IC card R/W or a magnetic card R/W. For the shield wire 107D, a shielded wire, not an ordinary wire, is used to protect the system from noise generated between the antenna 101D and the RF processing IC 102D. The actuator 105D is, for example, a driver's seat position adjusting motor, or a door-mirror angle adjusting motor.

Figure 32:
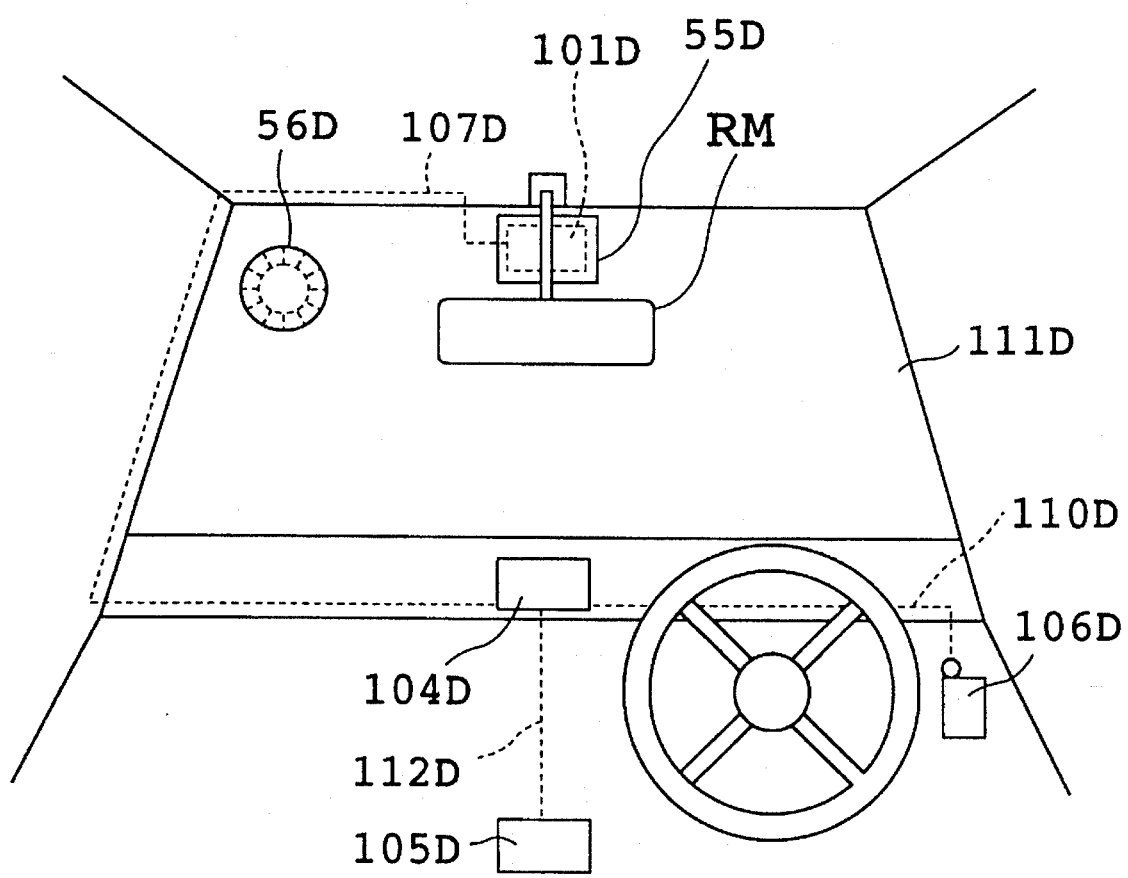
FIG. 32 is a general view of the windshield glass of a vehicle incorporating the responding circuit of the second embodiment of the fifth invention, as viewed from inside the vehicle.

More specifically, the antenna 101D is embedded in the front windshield 111D at a position behind the rearview mirror RM, where the mandatory vehicle inspection label 55D is attached, or at a position where the regular check and maintenance label 56D is attached, so that it does not obstruct the driver's view, as shown in FIG. 32. The antenna 101D is connected to the information processor 104D housed in the dashboard, by the shield wire 107D laid around the front windshield 111D.

Figure 33:
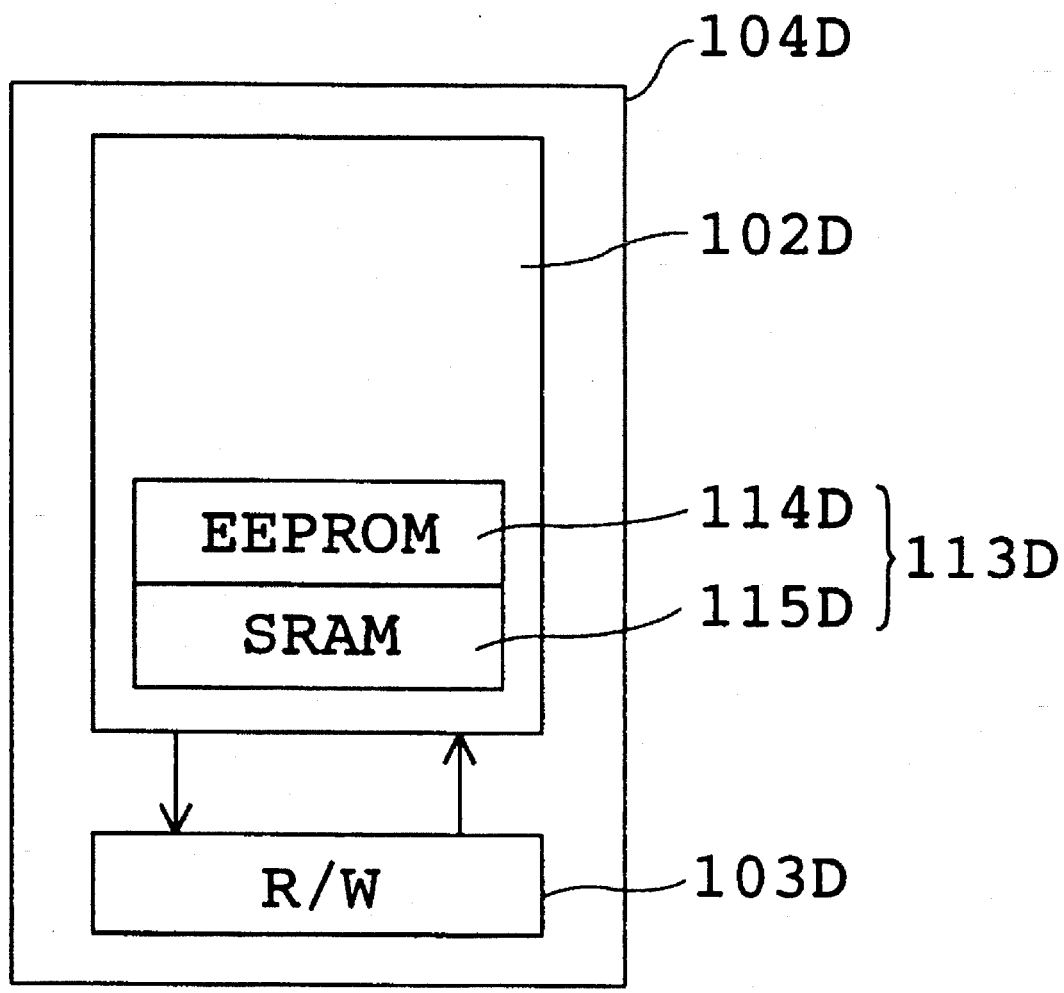
FIG. 33 is a circuit diagram for explaining the memory in the RF processing IC of the information processor.

As shown in FIG. 33, the RF processing IC 102D of the information processor 104D includes two different memories 113D: an EEPROM 114D whose data can be rewritten electrically but cannot be erased or changed by ON/OFF of power supply or by ultraviolet ray radiation; and an SRAM 115D whose data can be reset (erased) by ON/OFF of power supply. The identifying information specific to a vehicle, such as the license plate number, and the expiration date of the mandatory inspection certificate, is stored in the EEPROM 114D. Information on an individual person such as the person's identification number for a membership athletic club; and the registration number for the toll road accounting system of FIG. 24 or for a particular parking space of the incoming/outgoing vehicle management system of a parking lot (FIG. 25) is stored in either the SRAM 115D or the EEPROM 114D. The information processor 104D is equipped with a ten-key board so that individual information can be called from the EEPROM 114D by inputting the appropriate code number.

The operation of the second embodiment of the fifth invention is described in the following.

When the relevant vehicle is registered, the vehicle registration number, the expiration date of the mandatory inspection certificate and other data specific to the vehicle are input to the EEPROM 114D of the RF processing IC 102D. Such data can be input to the EEPROM 114D through the R/W 103D by using an IC card or a magnetic card, or through the antenna 101D embedded in the front windshield 111D by sending radio waves to the antenna 101D. The data thus input can be changed only by officials of the Land Transportation Bureau at the time of vehicle mandatory inspection or reregistration, and cannot be changed by other individuals.

Prior to using the vehicle for the first time, the driver is expected to input the individual information to the EEPROM 114D of the memory 113D, by inserting an IC card or magnetic card into the information processor 104D (R/W 103D) housed in the dashboard. At that time, the driver is also expected to register code numbers. The individual information thus stored is not erased by turning the power supply or the engine on or off, and can be called up as desired by inputting the appropriate code number. Accordingly, the driver need not carry his/her IC card or magnetic card. In addition, it is not necessary for the driver to input the individual information each time the vehicle is used.

In actual operation, when the vehicle engine is started, the vehicle-specific information stored in the EEPROM 114D, that is, the license plate number and the expiration date of the mandatory inspection certificate, are unconditionally input to the SRAM 115D. When a code number is input, the individual information as opposed to the code number is also uploaded. As the vehicle in this state is passing in front of the interrogator 8D of the system shown in FIG. 24 or 25, the interrogator 8D receives the information stored in the SRAM 115D from the antenna 101D embedded in the vehicle.

The information received by the interrogator 8D is input to the host computer (not shown) of the system for necessary processing. When the interrogator 8D transmits information, it is received by the antenna 101D of the vehicle, and written in the EEPROM 114D of the information processor 104D when necessary.

When the engine is stopped, the power supply 106D is turned off, and the information in the SRAM 115D of the RF processing IC 102D is erased while the information stored in the EEPROM 114D remains unerased.

In the above second embodiment of the fifth invention, the RF processing IC 102D is installed in the information processor 104D housed in the dashboard. Alternatively, it may be embedded together with the antenna 101D in the front windshield 111D. In that case, the shield wire 107D is not necessary.

In the above second embodiment, code numbers are used to call up individual information. Other means, such as a magnetic card, IC card, and collation of fingerprints, may be used to this end, as long as it enables the driver to confirm the information specific to the vehicle.

In the above second embodiment, the antenna 101D is embedded in the front windshield 111D. It may be attached to the inside of the front windshield 111D. The information processor 104D may be equipped with a display to show the content of communication. The R/W 103D may be an optical card R/W instead of an IC or magnetic card R/W.

The embodiments of the first through the fifth inventions have been described independently in the above paragraphs. Needless to say, the mobile object identification system is realized by combining the first through the fifth inventions.

INDUSTRIAL APPLICABILITY OF THE INVENTION

According to the first invention, as described above, if the responder for the mobile object identification system receives a write signal from a writing interrogator, with the write completion status stored, the control means invalidates the write signal. Consequently, the responder writes data only once as it passes through the communication area of the writing interrogator. Thus, despite its simple construction, the first invention is effective in preventing duplicate data writing.

According to the second invention, the interrogator of the communication complex for the mobile object identification system includes a level judging circuit to identify the highest level responding signal of those received by the stationary antenna, and a signal selection circuit to selectively output to the control device the responding signal identified by the level judging circuit. With the communication complex according to the second invention, therefore, it is not necessary to switch over the multiple antennas of the interrogator to communicate with the responder. In other words, the second invention provides such a superior effect that it allows the responder to complete communicating with the interrogator without interruption.

With the mobile object identification equipment according to the third invention, the control means controls the plurality of interrogators so that at least those interrogators whose communication areas overlap provide different-frequency carrier waves and transmit interrogatory signals at different timings. Therefore, even in the overlapping zone of communication areas, there is no need to divide interrogator output signals communication time, and there is no possibility that the responder receives two interrogatory signals at a time. Thus, the third invention provides such superior effects that it prevents radio interference and promises accurate and prompt communication even when the responder is moving at high speed.

When the electronic label for the mobile object identification system according to the fourth or fifth invention is attached to or embedded in a vehicle, and when an interrogatory signal is sent from an external interrogator to the vehicle, the responding circuit receives the interrogatory signal and sends back appropriate vehicle information stored in advance in the responding circuit. Therefore, it is not necessary for persons to identify vehicle information visually. In addition, the vehicle information can be identified easily even when the vehicle is moving. If the electronic label bears on its surface the information provided on the particular labels legally required to be attached to the front windshield of a vehicle, the electronic label can be attached to the front windshield without causing any problems. As well, the electronic label bearing such information on the surface is not expected to be removed from the vehicle. Accordingly, the information read from the electronic label may be reasonably considered as information specific to the vehicle.

Thus, with the electronic label according to the fourth or fifth invention, the vehicle-related information, such as the frame number and the expiration date of the mandatory inspection certificate, can be collected by the interrogator by non-contact means, and not visually. Therefore, the fourth or fifth invention is extremely effective if applied to the toll or parking charge collecting system, illegal vehicle or illegal parking control by the police, criminal investigation by the police etc.

What is claimed is:

1. A responder which is attached to a movable object for writing data when receiving a write signal in a communication area of a writing interrogator and reading and transmitting data when receiving a read signal in said communication area of a reading interrogator, as said responder is moved with said movable object, said responder comprising:

data storage means for storing data;

control means for controlling a process of writing data into said storage means, and for controlling a process of reading data from said data storage means; and status storage means for storing write completion status data when said control means controls said process of writing data to said data storage means in response to a first write signal from said writing interrogator;

said control means invalidating said process of writing data to said data storage means when said control means receives a second write signal from said writing interrogator.

2. A communication system for a mobile object identification system, comprising:

a responder transmitting and receiving signals through a mobile antenna mounted on a mobile object;

an interrogator transmitting and receiving signals through a plurality of stationary antennas installed along a moving area of said mobile object, said plurality of stationary antennas having respective communication areas which overlap partly in a direction of movement of said mobile object; and a control device controlling an operation of said interrogator;

wherein said interrogator includes level judging and signal selecting means for simultaneously judging respective signal levels of a plurality of responding signals received respectively by said plurality of stationary antennas, for selecting one of said plurality of responding signals, and for outputting said selected one of said plurality of responding signals.

3. A mobile object identification system, comprising:

a responder mounted on a mobile object and which, when receiving an interrogatory signal with a first frequency, modulates by a responding signal an unmodulated carrier wave received after said interrogatory signal, and which transmits said responding-signal-modulated carrier wave;

a plurality of interrogators, each of said plurality of interrogators modulating a respective carrier wave having a predetermined frequency allocated for respective overlapping communication areas of each of said plurality of interrogators by a respective interrogatory signal, each of said plurality of interrogators transmitting said modulated carrier wave, followed by an unmodulated carrier wave, to said respective communication area, adjacent ones of said respective communication areas of said plurality of interrogators having different carrier frequencies, and each of said plurality of interrogators receiving a responding signal from said responder when positioned in said respective communication area; and control means for controlling said plurality of interrogators so that said adjacent ones of said plurality of interrogators transmit said respective interrogatory signals at different times.

4. An electronic label for a mobile object identification system, comprising:

a responding circuit for storing vehicle information varying from vehicle to vehicle, said responding circuit outputting said vehicle information in response to an interrogatory signal received from an interrogator; and a visual information sheet attached on a windshield glass of a vehicle to face said responding circuit, said visual information sheet being displayed on said vehicle so as to be seen from an exterior of said vehicle;

wherein at least said responding circuit is embedded in said windshield glass of said vehicle.

5. An electronic label for a mobile object identification system, comprising:

a responding circuit which is embedded in a windshield glass of a vehicle, said responding circuit storing vehicle information varying from vehicle to vehicle, and said responding circuit outputting said vehicle information in response to an interrogatory signal received from an interrogator;

said responding circuit being placed just above a rear view mirror of said vehicle and connected to a battery of said vehicle through a power line.

6. A responder according to claim 1, wherein said control means invalidates said process of writing data to said data storage means when said control means receives a second write signal from said writing interrogator and said write completion status data retained in said status storage means indicates that said control means allowed data in response to said first write signal to be written to said data storage means.

* * * * *